(12) United States Patent
Huggett

(10) Patent No.: US 11,597,325 B2
(45) Date of Patent: Mar. 7, 2023

(54) SECURE STORAGE SYSTEMS FOR VEHICLES

(71) Applicant: Diabolical, LLC, Herriman, UT (US)

(72) Inventor: Alan K. Huggett, Herriman, UT (US)

(73) Assignee: Diabolical LLC, Herriman, UT (US)

( * ) Notice: Subject to any disclaimer, the term of this patent is extended or adjusted under 35 U.S.C. 154(b) by 0 days.

(21) Appl. No.: 17/456,295

(22) Filed: Nov. 23, 2021

(65) Prior Publication Data

US 2022/0161729 A1 May 26, 2022

Related U.S. Application Data

(60) Provisional application No. 63/117,028, filed on Nov. 23, 2020.

(51) Int. Cl.
*B60R 5/04* (2006.01)
*B60R 7/02* (2006.01)
*B60R 11/06* (2006.01)

(52) U.S. Cl.
CPC ............ *B60R 5/04* (2013.01); *B60R 7/02* (2013.01); *B60R 11/06* (2013.01)

(58) Field of Classification Search
CPC .. B60R 5/04; B60R 7/02; B60R 11/06; B60R 7/043
USPC ........................................ 296/37.15, 37.16
See application file for complete search history.

(56) References Cited

U.S. PATENT DOCUMENTS

| | | | | |
|---|---|---|---|---|
| 4,842,175 A * | 6/1989 | Towsend | ........... | B60R 11/06 296/37.16 |
| 4,941,702 A * | 7/1990 | Southward | ........... | B62D 47/003 296/190.08 |
| 6,065,794 A * | 5/2000 | Schlachter | ........... | B60R 5/04 296/37.16 |
| 6,113,179 A * | 9/2000 | Szigeti | ........... | B60R 5/04 296/37.16 |
| 6,447,051 B1 * | 9/2002 | Lukomskiy | ........... | B60P 3/40 296/183.1 |
| 6,540,279 B1 * | 4/2003 | Bargiel | ........... | B60R 7/043 296/65.05 |
| 10,232,690 B1 | 3/2019 | Huggett | | |
| 10,688,853 B2 | 6/2020 | Huggett | | |

(Continued)

OTHER PUBLICATIONS

EighT13 Fabrication & Design, Under Seat Storage Bin—Full MOLLE Front and Base, Retrieved on Nov. 23, 2021 from https://www.813fabrication.com/product-page/under-seat-bin-full-molle-front-and-base.
JCR, JT Underseat MOLLE Storage Basket | Jeep Gladiator (2020+, Retrieved on Nov. 23, 2021 from https://www.icroffroad.com/product/JTUMP.html.

(Continued)

*Primary Examiner* — Pinel E Romain
(74) *Attorney, Agent, or Firm* — VLP Law Group, LLP; Michel Bohn

(57) ABSTRACT

An enclosure system for vehicles may include a body with mounting points for mounting the body in a passenger compartment of a vehicle and adapted to fit under a bench seat in the vehicle. The body may include multiple walls coupled together and may couple with one or more doors. For example, the one or more doors may couple with the body with one or more hinges and may close over a top of the body to form one or more cavities in which items may be stored. The enclosure system may also include one or more locking mechanisms for coupling the doors in a closed position and securing the cavities and items within the cavities.

20 Claims, 23 Drawing Sheets

(56) References Cited

U.S. PATENT DOCUMENTS 10,974,653 B2 * 4/2021 Scaringe ............... B60R 5/006
2004/0149791 A1 * 8/2004 Tuel, Jr. ............... B60R 7/043
224/42.11

OTHER PUBLICATIONS

MOPAR/Jeep, BAMWholesaleParts.com, Jeep Gladiator Lockable Rear Underseat Storage Bin 6LT89TX7AC MOPAR OEM—MOPAR (6LT89TX7AC), Retrieved on Nov. 23, 2021 from https://www.bamwholesaleparts.com/oem-parts/mopar-jeep-gladiator-lockable-rear-underseat-storage-bin-6lt89tx7ac-mopar-oem-6lt89tx7ac?origin=pla&gclid=CjwKCAiAv_KMBhAzEiwAs-rX1PAK5R7-ph1yMJHu7pPJjUuDlrlVm3c4Oi4_cFjaM25cDJYA7g5VbBoCl2lQAvD_BwE.

WeatherTech, 2020 Jeep Gladiator Under Seat Storage System, Retrieved on Nov. 23, 2021 from https://www.weathertech.com/jeep/2020/gladiator/under-seat-storage-system/.

Du-Ha Chevrolet & GMC Silverado/Sierra Light Duty Crew Cab—2019-2021 & 2020-2021 Heavy Duty Crew Cab—w/ Lockable Lid, Retrieved on Nov. 23, 2021 from https://www.gunsafes.com/du-ha-underseat-storage-gun-case-04-15-nissan-titan-king-cab-and-crew-cab-clone.html?gclid=CjwKCAiAv_KMBhAzEiwAs-rX1PtoWRCnMhRJqFAuvDtlrJFykVI4onzKVEd_fXQRMeY4nhMcL3VgYxoCfk8QAvD_BwE.

\* cited by examiner

SECURE STORAGE SYSTEMS FOR VEHICLES

BACKGROUND

The present disclosure relates to a secure modular enclosure for vehicles.

Many automotive and outdoor enthusiasts enjoy vehicles such as a Jeep Wrangler®, Bronco®, Hummer®, or another all-terrain vehicle. However, some of these vehicles do not provide secure storage, due to the openness of their storage areas. Past solutions for providing secure storage or weather protection include a hard shell covering the interior of the vehicle, but these solutions negate the advantages of a vehicle.

Accordingly, it is desirable to provide storage systems for such vehicles; however, the open nature of the storage areas of vehicles presents unique challenges not in typical other storage enclosures or trunks of vehicles. Existing enclosures to the storage areas of open-top vehicles are inadequate as they are not secure, not adaptable to varying sized cargo, are not sufficiently strong to support items on top of the enclosure, and not adaptable to various vehicles. For example, some existing enclosures do not securely cover the entirety of the storage area, so that items within the enclosure can be accessed from the outside of the enclosure.

Furthermore, even vehicles that are enclosed need secure storage and connection for gear and accessories. For example, even when certain items are locked inside an enclosed vehicle, they may not be secure from thieves, valet drivers, children, or other parties. For example, a hunting enthusiast may require secure storage inside a vehicle in which to store a rifle to prevent access by a child or thief; however, current solutions for storing items in a vehicle do not lock or otherwise prohibit items from being viewed and/or are easily opened.

Finally, it is desirable to mount various accessories to a vehicle, such as backpacks, radar detectors, sunglass holders, or cameras, etc. Currently, visors, handles, parcel shelves, etc., do not provide sufficient or sturdy enough connection points for mounting accessories, especially when those accessories are subject to the motions and angles associated with off-roading.

Accordingly, there is a need to provide enclosure systems, vehicle mounting systems, and various accessories that secure items, for example, within the enclosure systems or otherwise to vehicles.

SUMMARY

The present disclosure describes one or more storage and coupling systems for a vehicle. For example, the systems may include various implementations of vehicle accessories. One general aspect of the system includes an enclosure system mountable to a storage area of a vehicle. Another general aspect of the system includes an enclosure system mountable under a seat of the vehicle. Another general aspect of the system includes a sliding table system that provides a table and/or easier access to a storage area of the vehicle.

According to some implementations, the enclosure system may include a body including one or more mounting points for mounting the body in a passenger compartment of a vehicle and adapted to fit under a bench seat in the vehicle, the body including a front wall, a rear wall, a first side wall, and a second side wall, the front wall being located toward a front end of the vehicle when the enclosure system is mounted in the vehicle, the rear wall being located toward a rear end of the vehicle when the enclosure system is mounted in the vehicle, the first side wall and the second side wall coupling the front wall and the rear wall together; a first door coupled with the body using a first hinge, the first hinge coupling a first edge of the first door with a top edge of the front wall of the body, the first door closing over a top of the body when in a closed position and pivoting toward the front end of the vehicle when in an open position, the first door and the body forming a first cavity when the first door is in a closed position; and a first locking mechanism locking the first door with the body.

Some implementations of the enclosure system may include one or more additional or alternative features including: a second door coupled with the body using a second hinge, the second hinge coupling a second edge of the second door with the top edge of the front wall of the body, the second door closing over the top of the body when in a closed position and pivoting toward the front end of the vehicle when in an open position, the first door and second door covering the first cavity when the first door and the second door are in a closed position; a third door coupled with the body using a third hinge, the third hinge coupling a third edge of the third door with the rear wall of the body, the third door closing over the top of the body when in a closed position and pivoting toward the rear end of the vehicle when in an open position, the third door and the body enclosing a second cavity in the enclosure system; that the front wall is vertical, and that the first door forms an acute angle with the front wall when the first door is in a closed position; and that the body includes a floor panel coupled with the rear wall, the floor panel enclosing the first cavity and including the one or more mounting points for mounting the body to the vehicle, and the second cavity includes an opening exposing a floor of the vehicle in the second cavity.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation, in the figures of the accompanying drawings in which like reference numerals are used to refer to similar elements.

DETAILED DESCRIPTION

Figure 1A:
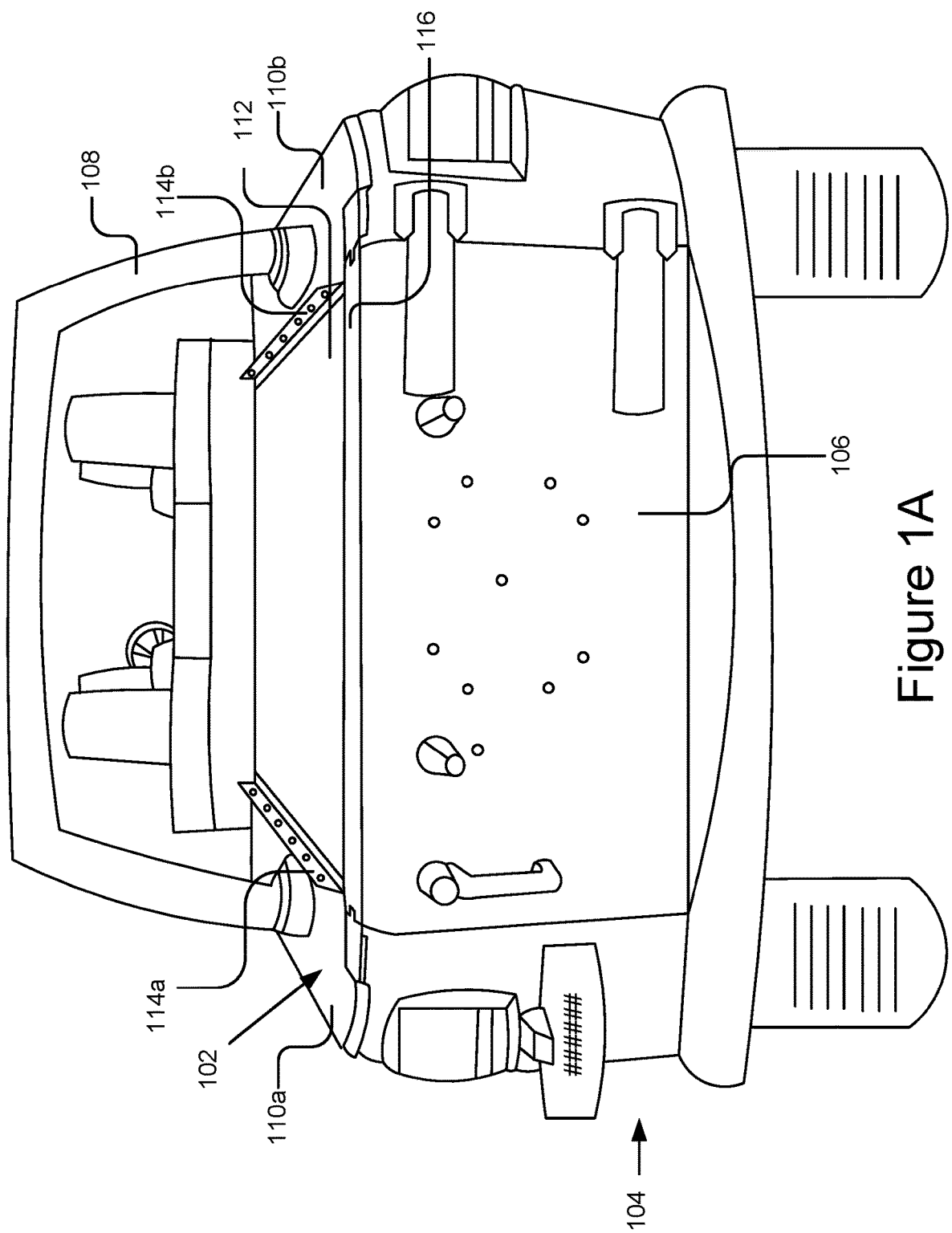
FIGS. 1A and 1B are back perspective views of an example enclosure system mounted to the storage area of an example vehicle.

Implementations of a secure storage system or enclosure system 102 described herein may be an alternative for a complete storage system using the existing body structure of a vehicle 104. In some implementations, an enclosure system 102, in combination with the floor and walls of a vehicle 104 (e.g., an off-road vehicle 104, open-top or soft-top vehicle 104, etc., as described below), forms a strong structure with a secure interior cavity 120. The enclosure system 102 may be a modular system with an internal frame structure and removable top and wall panels. The frame structure and materials provide substantially more support than existing technology. Further, the enclosure system 102 may be configured for multiple uses and configurations which are multi-function, upgradable, modifiable, and/or designed to easily adapt to different uses and vehicles 104, unlike existing technology, which may be designed only to enclose a cavity. Various implementations of the enclosure system are described throughout this description, such as in reference to FIGS. 1A-3B.

This disclosure also describes an implementation of an enclosure system that mounts under a seat of a vehicle. For example, the under-seat enclosure system (also referred to as an enclosure system or a seat locker herein) may be placed (e.g., temporarily, detachably, or permanently) under a folding rear seat of a vehicle, such as a pickup truck. The under-seat enclosure system may provide secure in-vehicle storage for valuables, such as wallets, purses, computers, guns/rifles, or other items, which would benefit from an additional level of security beyond that provided by the vehicle. In some implementations, the under-seat enclosure system may provide one or more enclosed cavities in which items may be stored and which are closed by lockable doors. For example, a vehicle may have a folding or pivoting bench seat that tips upward and provides access (e.g., to a lid or door of the enclosure) to the under-seat enclosure system mounted under the vehicles bench seat. Various implementations of the under-seat enclosure system are described throughout this description, such as in reference to FIGS. 4A-4F.

Various implementations of accessory holders, such as a visor shelf, which couples with a vehicle near a top or bottom of a windshield, which may be at or adjacent to visors are also described herein. The visor shelf may include various mechanisms allowing it to be mounted to the vehicle, such as to visor mounting points and may include structures providing rigidity and mounting ability to various accessories, such as dashboard cameras, GoPro® cameras, sunglass holders, etc. Example implementations for the visor shelf are described in reference to FIGS. 5A-5D herein.

Another example accessory holder may include a rack that couples with an enclosure system, such as via a tie-down bracket, bolts, rails, or other components thereby providing additional mounting points and/or rigidity to the enclosure system. An example implementation for the rack is described in reference to FIG. 6.

Additionally, an improved shelf-drawer system, which may be used with or separately from an enclosure system, is described herein. For instance, the shelf-drawer system may include one or more of a shelf and a drawer that provide increased storage and/or accessibility to an area enclosed by a trunk of a vehicle, an enclosure system, or other location. The shelf-drawer system may be adaptable to various mounting methods, heights, and other configurations thereby allowing it to provide storage an access to items on top of the shelf, on top of the drawer, and/or underneath the drawer even while being able to be mounted to various vehicle configurations. Example implementations of the shelf-drawer system are described throughout this disclosure, for example, in reference to FIGS. 7A-7F.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Some implementations of the enclosure system 102 described in reference to FIGS. 1A-3B and other figures herein may be a modular platform with a pivoting and/or replaceable top and wall panels to accommodate tall, large, long, or other cargo that may not typically fit in a storage enclosure for vehicles 104.

The enclosure system 102 may have the ability to secure gear in the form of its own "trunk" (e.g., the enclosure or interior cavity 120 described herein) and may be configured with a removable top to allow the enclosure system 102 to store tall cargo. The vertical wall or wall system 210 may also be made for removal or include a removable panel and/or access panel, so that pass through (e.g., long or awkwardly shaped) cargo can be carried. For example, a wall system 210 or a portion thereof can fold down or be removed when the rear seats of the vehicle 104 are folded down. The wall system 210 may be configured similar to a removable top with pins or locks for removal or pivoting, as described in detail below.

The configuration of the enclosure system 102 described herein may also provide a modular platform where skins, walls, or other components can be replaced or adjusted to accommodate different sizes, shapes, or types of vehicles 104. The top panel 112 can be removed or tilted to provide access to the interior cavity 120 and/or for storage of tall cargo, or the top panel 112 can be replaced with top panels of different sizes to increase the interior volume of the interior cavity 120. A wall panel can be removed or folded down accommodate long cargo. A locking access panel may be included in the wall panel to provide access from the front of the enclosure system 102 or the passenger compartment of the vehicle 104. Depending on the implementation, the engineering of a frame system, associated support brackets, and interaction of the frame system with the other components of the enclosure system 102 provides a modular platform with these benefits while the system retains substantial strength to allow the top surface thereof to be load bearing.

The enclosure system 102 described herein may be substantially stronger than previously existing technology due its use of materials, such as steel, aluminum, plastics, or other strong materials, and a frame with brackets that use the factory mounts and bolt locations on vehicles 104. When the various components are connected, the strength may be in the collective design of the components.

As discussed in more detail below in reference to FIG. 1B, some implementations of the enclosure system 102 further provide the benefit of securing a storage area of the vehicle (e.g., an open-top vehicle 104, as described below). Some security features of the enclosure system 102 include that the interior cavity 120 or enclosure may not be accessible other than through the rear gate 106 (or access panel of the wall system 210, depending on the implementation) of the vehicle 104 and removable panels of the enclosure system 102 may not be removed until access through the rear gate 106 is obtained. This may be accomplished using the components of the enclosure system 102 as well as the use of carriage bolts and/or quick-release pins, as described below.

Figure 1B:
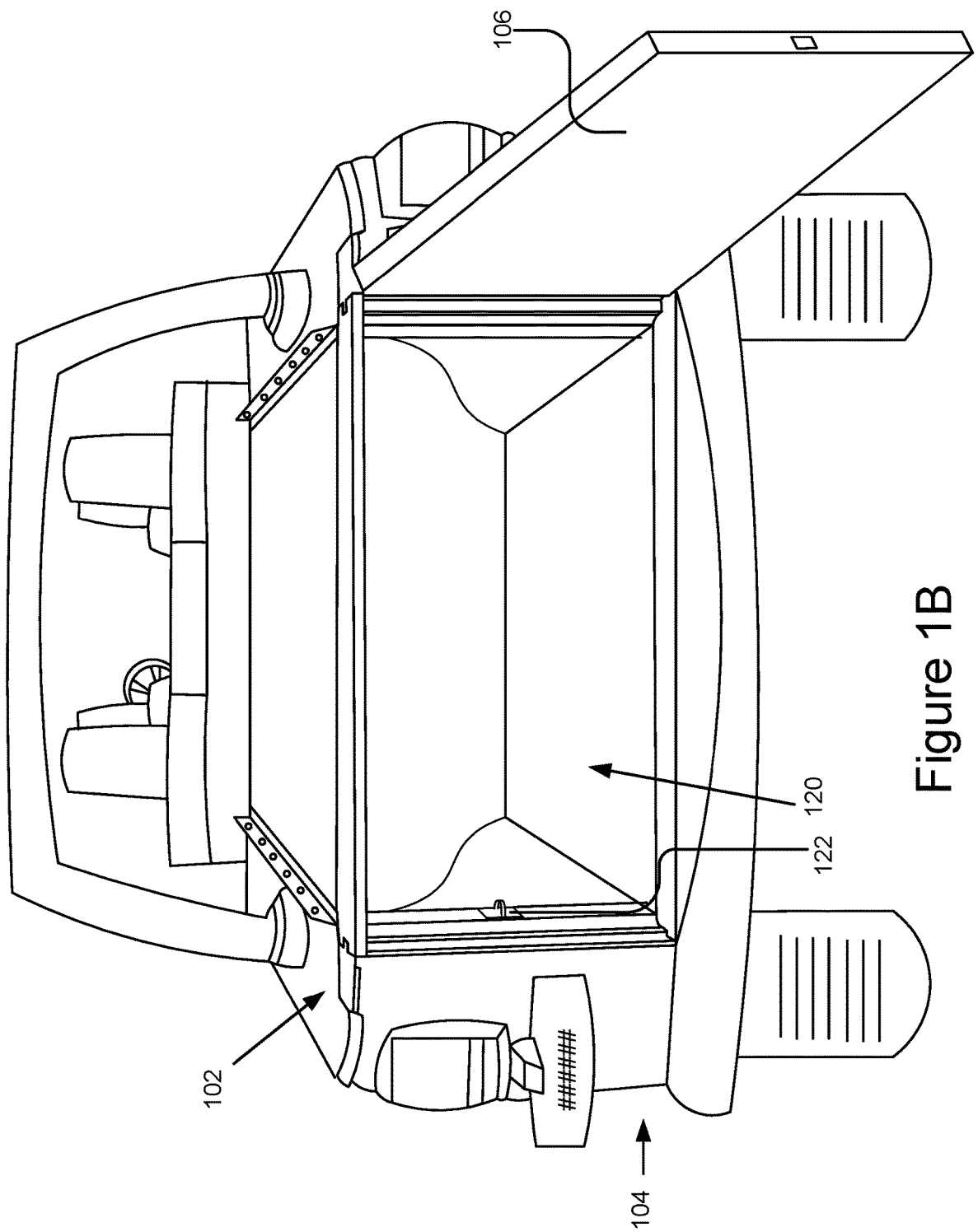

Another security feature, according to some implementations of the enclosure system 102, may include skins or walls that extend to, match the contours of, and, in some instances, secure to the floor, sides, gate, or roll bars 108, etc., of the vehicle 104 (e.g., of a top edge of a storage area of the vehicle 104, as illustrated in FIGS. 1A and 1B).

FIG. 1A is a back-perspective view of an example enclosure system 102 installed on a storage area of an example open-top vehicle 104. As illustrated, the vehicle's storage area may be open, so that the enclosure system 102 may cover or enclose the storage area in order to secure cargo items in an interior cavity 120 formed by the enclosure system 102 and the vehicle 104, thereby protecting the cargo from theft, or weather.

Some examples of vehicles 104 that may claim particular benefit of the enclosure system 102 include Jeep Wranglers® such as, the following models: CJ, YJ, TJ, LJ, JK, JKU, JT, and JL; Jeep Gladiator®, Bronco™, Hummer®; side-by-side or other all-terrain vehicles 104; etc. It should be noted that these vehicles 104 are provided by way of example and other vehicles 104 are possible and contemplated. The enclosure system 102 may be configured to be easily modified to match changes to future vehicle 104 models (e.g., changes in length, height, roll bar location, mount options, etc.). These and other implementations are described in further detail in reference to the figures below. The enclosure system 102 may be configured to be used on many different vehicles 104.

As illustrated in FIG. 1A, the enclosure system 102 may include a removable top panel 112 and/or one or more skins 110a and 110b and 116 that form a top surface among a rear gate 106 of the vehicle 104, a left side of the vehicle 104, a right side of the vehicle 104 and a wall system 210 separating the storage area of the vehicle 104 from the passenger area of the vehicle 104. In some implementations, the skins may be attached to frame members (not shown in FIG. 1A) to cover the top edges of the sides of the vehicle 104. The skins 110 or sidewalls may have one or more cutouts for roll bars 108, wires, or other items to pass through while the enclosure system 102 covers the entire rear storage compartment of the vehicle 104 for weather protection and to prevent entry from the outside of the enclosure (e.g., as by theft of cargo items).

In some implementations, skins 110 or sidewalls of the enclosure system 102 may follow the contours of the vehicle body and may be configured to remain in place with a vehicle hardtop or soft top in place or removed. Thus, once the enclosure system 102 is installed, it may not have to be removed. In some implementations, a user may merely install and/or remove the vehicle's hardtop without interference by the enclosure system 102.

The skins or sidewalls of the secure storage system fit securely onto the frame members (discussed in further detail below) and have a very small gap (e.g., in the range of 1/16 to 1/2 inch, 1/8 inch, less than 1 inch, etc.) around the roll bars 108, etc. The skins may be configured to fit any of the different roll bar locations associated with the year and model of the vehicle 104 (e.g., models of the Jeep Wrangler®). For example, different side skins may be used to accommodate the sizes of sides, wiring, roll bars 108, etc., of different model years of the vehicle 104. Accordingly, in some implementations, once the enclosure system 102 is installed, the only access on the interior cavity 120 may be through the tailgate using the vehicle's factory locking capabilities. In some implementations, the enclosure system 102 is configured to allow use of individual locks that utilize the frame structure of the enclosure system 102 for the locks to secure the interior cavity 120 formed by the vehicle 104 and the enclosure system 102.

The combined strength of the components of the enclosure system 102 allows the enclosure system 102 to support substantial weight on the top. This strength may be derived from the combination of its components and integration with mounting points of the vehicle 104. The enclosure system 102 may be configured to securely support objects on its top, for example, using tie down brackets 114 and/or a rack system, such as is described below.

In some implementations, the enclosure system 102 may include tie down brackets 114a and 114b. The tie down brackets 114 may be used to tie objects to the top of the enclosure system 102. In some implementations, the tie down brackets 114 may be securely attached to top frame members, described elsewhere herein, to provide additional strength to the assembly and to allow objects to be tied to the top of the enclosure system 102. In some implementations, the tie down brackets 114 may be attached to the removable top, so the top may be opened without removing the attached objects. In some implementations, the tie down brackets 114 may be attached to the side walls (e.g., as described in reference to FIGS. 2A-3B) or other components to allow the tie down brackets 114 to be used even when the removable top is removed or in an open position.

In some implementations, the enclosure system 102 may be configured to incorporate accessories, such as molle panels to hold gear, different sizes of top panels or skins, or other accessories. For example, the removable top panel 112 may include an accessory rubber pad (not shown) mounted thereto upon which objects may be placed to prevent items from sliding across the removable top. The rubber pad may be attached using straps, friction, adhesive, magnets, or other attachment means.

FIG. 1B is a back-perspective view of an example enclosure system 102 mounted to the storage area of an example vehicle 104 with a rear gate 106 of the vehicle 104 in an open position. As illustrated, the enclosure system 102 (e.g., in combination with the storage area of the vehicle 104) forms an enclosure or interior cavity 120. The interior cavity 120 may be accessed by opening the rear gate 106 of the vehicle 104. The vehicle 104 may also include a latch striker plate 122 for securing the rear gate 106 closed.

In some implementations, the enclosure system 102 secures the storage area of the vehicle 104 so that the interior cavity 120 or enclosure may be accessible through the rear gate 106 (or access panel of the wall system, depending on the implementation) of the vehicle 104 and removable panels of the enclosure system 102 are not removable until access through the rear gate 106 is obtained (unless a removable top panel 112, wall panel, or access panel is opened or removed). For example, components of the enclosure system 102 may be assembled using bolts and/or quick-release pins that are accessible only from the interior cavity 120 of the enclosure system 102. Fasteners that are used to assemble the enclosure system 102 may be configured such that the enclosure system 102 cannot be opened from the outside the interior cavity 120 while the system is assembled and attached to a vehicle 104. For instance, the skins or side walls may be bolted to frame member(s) of the enclosure system 102 using carriage bolts where the nut of the carriage bolt faces inward toward the interior cavity 120 so that the bolts can only be tightened or loosened from inside the interior cavity 120 in order to prevent disassembly and/or unauthorized access to the interior cavity 120. Similarly, in some implementations, a removable top panel 112 and/or removable wall panel may be secured to the enclosure system 102 (e.g., via frame members) using quick-release pins that are accessible only from the interior cavity 120.

It should be noted that while the components of the enclosure system 102 may be assembled using methods that allow components to be easily attached and detached, such as quick-release pins, other fasteners or fastening methods are possible and contemplated herein. Although quick-release pins and carriage bolts are described herein, other fasteners or fastening methods (e.g., welding, integral forming of components of the secure storage system 102, etc.) are possible and contemplated.

Figure 2A:
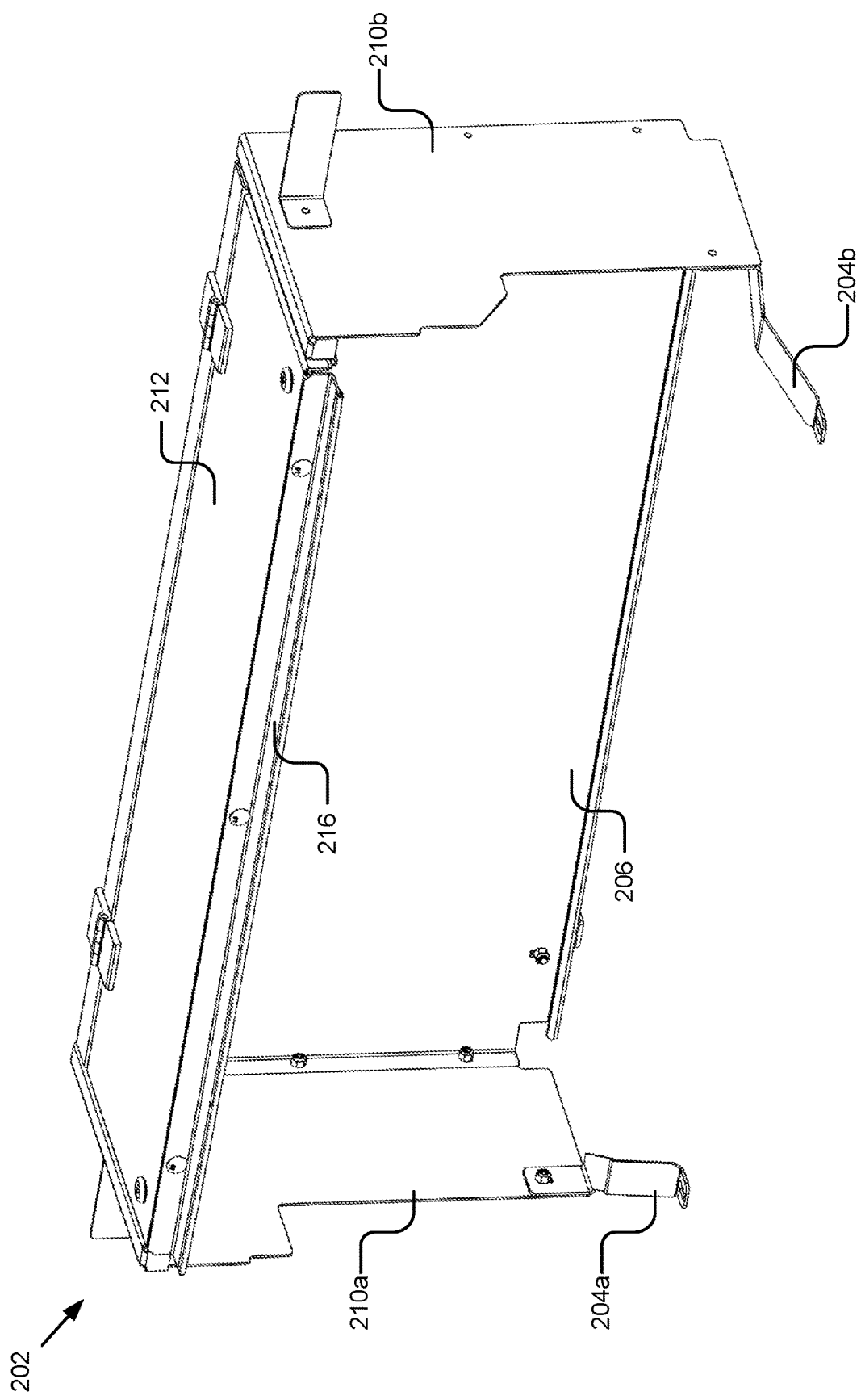
FIGS. 2A and 2B illustrate an example enclosure system.
Figure 2B:
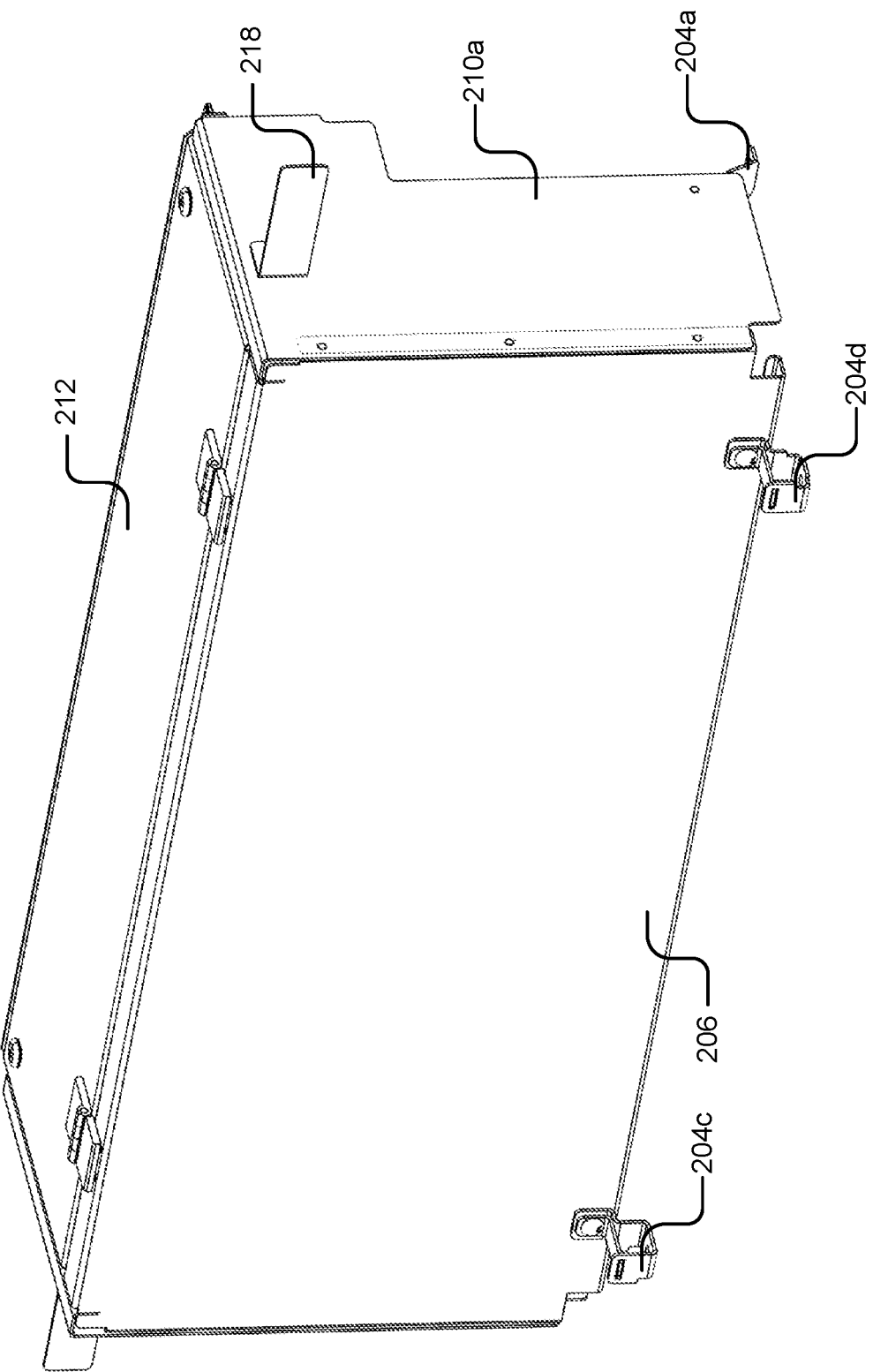

FIG. 2A is a rear (e.g., facing a rear end of a vehicle 104 when mounted to the vehicle 104) perspective view and FIG. 2B is a front (e.g., facing a front end of a vehicle 104 when mounted to the vehicle 104) perspective view of an example enclosure system 202 for vehicles 104. The example enclosure system 202 may represent an example implementation of the enclosure system 102 described above and features and components of the enclosure systems 102 and 202 may be changed without departing from the scope of this disclosure.

The example enclosure systems 202 include several innovations over those in FIGS. 1A-1B. As an example, the illustrated enclosure system may be configured for a JK Jeep Wrangler® (e.g., 2007-2018), although other vehicles are possible and contemplated herein. The example enclosure system 202 may also accommodate various accessories or vehicle configurations, for example, for plugs, lights, subwoofers, factory bolts, etc.

As illustrated, the enclosure system 202 may be adaptable by using components that may be replaced, such as side walls 210a and 210b, mounting brackets 204a and 204b, etc., to adapt to various vehicle configurations.

The example enclosure system 202 illustrated in FIGS. 2A and 2B includes a lid/top 212 that hingeably connects to a back wall 206 (which may face a front end of the vehicle 104 when mounted to the vehicle). The back wall 106 may separate the interior of the enclosure 202 from an interior of the vehicle 104, remainder of a trunk area, back seat of the vehicle 104, etc. For instance, the enclosure system 202 may be sized and/or the back wall may be configured to allow a back seat of the vehicle 104 to remain attached to the vehicle 104 when the enclosure system 202 is installed. As illustrated, the back wall 206 may be attached (e.g., using bolts, quick release pins, etc.) to vertical side walls 210a and 210b. In some implementations, the side walls 210 may be interchangeable, adjustable, or modifiable, and may have various shapes or sizes to match various vehicles 104. For instance, the enclosure system may be adaptably mounted to various vehicles 104 by using different side walls 210. As illustrated, the side walls 210 have contours to match a trunk area of a vehicle 104.

As illustrated, the top and/or bottom edge(s) of the back wall 206 may include bends in its material to provide rigidity to the wall and enclosure system. The back wall may also include hinge mounting points (e.g., on flat top area of the wall) that allow hinges to couple the lid 212 to the back wall 206.

In some implementations, the lid 212 may include an adapter plate 216 that bridges a gap between the lid and a tailgate of the vehicle 104 to enclose a space and prevent entry into the enclosure system 202. For instance, the adapter plate 216 may extend above the tailgate, to a side of the tailgate, into a groove of the tailgate, etc. The adapter plate 216 may further allow the enclosure system 202 to be used with various vehicles 104. In some implementations, the lid 212 may be extended or configured so that no attached adapter plate is used.

In some implementations, the top/lid 212 may include a lock that locks the lid to a side, back wall, or tailgate of the vehicle 104 in order to secure the lid 212 from opening the enclosure 202. Accordingly, in some implementations, using a key or similar lock, the enclosure system 202 may be accessed even when the tailgate is locked. The top 212 may have various configurations, for example, it may be raised or include a protruding or convex area that allows taller items to be stored inside the enclosure system 202. For instance, a lid 212 may be 4-6 inches tall, so that tall items may be enclosed in the enclosure system 202 and fit under/within the lid.

In some implementations, the top of each vertical side wall 210a and 210b may include bends, as illustrated, to provide support to the lid 212 and rigidity to the wall 210 and enclosure system 202. Accordingly, while implementations of the side walls 210 may attach to a separate frame, the side walls 210 may be integrated with or include frame structure(s), as illustrated. The side walls 210 may also be contoured to accommodate factory bolts or structures, subwoofers, or various other structures or accessories.

In some implementations, the enclosure system 202 may include attachment brackets 204a and 204b attached to or integrated with the side walls. The attachment brackets 204c and 204d may be attached to the rear wall 206. The attachment brackets 204 allow the side walls 210, rear wall 206, or other components, to be securely attached to the vehicle 104. For instance, the attachment brackets 204 may attach with vehicle mounting points, such as factory mounting points of a tailgate, seat, tie down bracket, etc.

The enclosure system 202 may also include spacing brackets 218 coupled with one or more of the side walls 210. The spacing brackets 218 may interact with one or more a side, roll cage, or other component of the vehicle 104 to prevent the one or more side walls 210 from deforming outward or otherwise provide support to the side walls 210.

A side wall 210 may include an integrated frame at its top (e.g., as illustrated, it may include one or more bends providing structural strength), bolts mounting to a back wall 206, and a mounting point at which the side wall may be coupled to a latch of a tailgate or other vehicle component. The mounting point may be a slot that allows the side wall to be adjustably mounted. In some implementations, the side wall(s) 210 may be contoured around tailgate opening mechanism(s), cables, and/or other vehicle structures.

The enclosure system 202 may provide a secure trunk system inside a sport utility vehicle, pickup truck, van, or other vehicle, such as an off-road vehicle or ATV. As shown, the enclosure system 202 may provide additional security in the vehicle. In some implementations, the enclosure system may include a molle panel, hooks, bolts, etc., attached or integrated into its underside to allow items to be connected or suspended from inside the enclosure. For instance, the enclosure system 202 may have one or more hooks attached to the lid/top, back wall, and/or side wall to allow backpacks, grocery bags, vehicle accessories, or other items to be suspended or secured thereto.

Figure 3A:
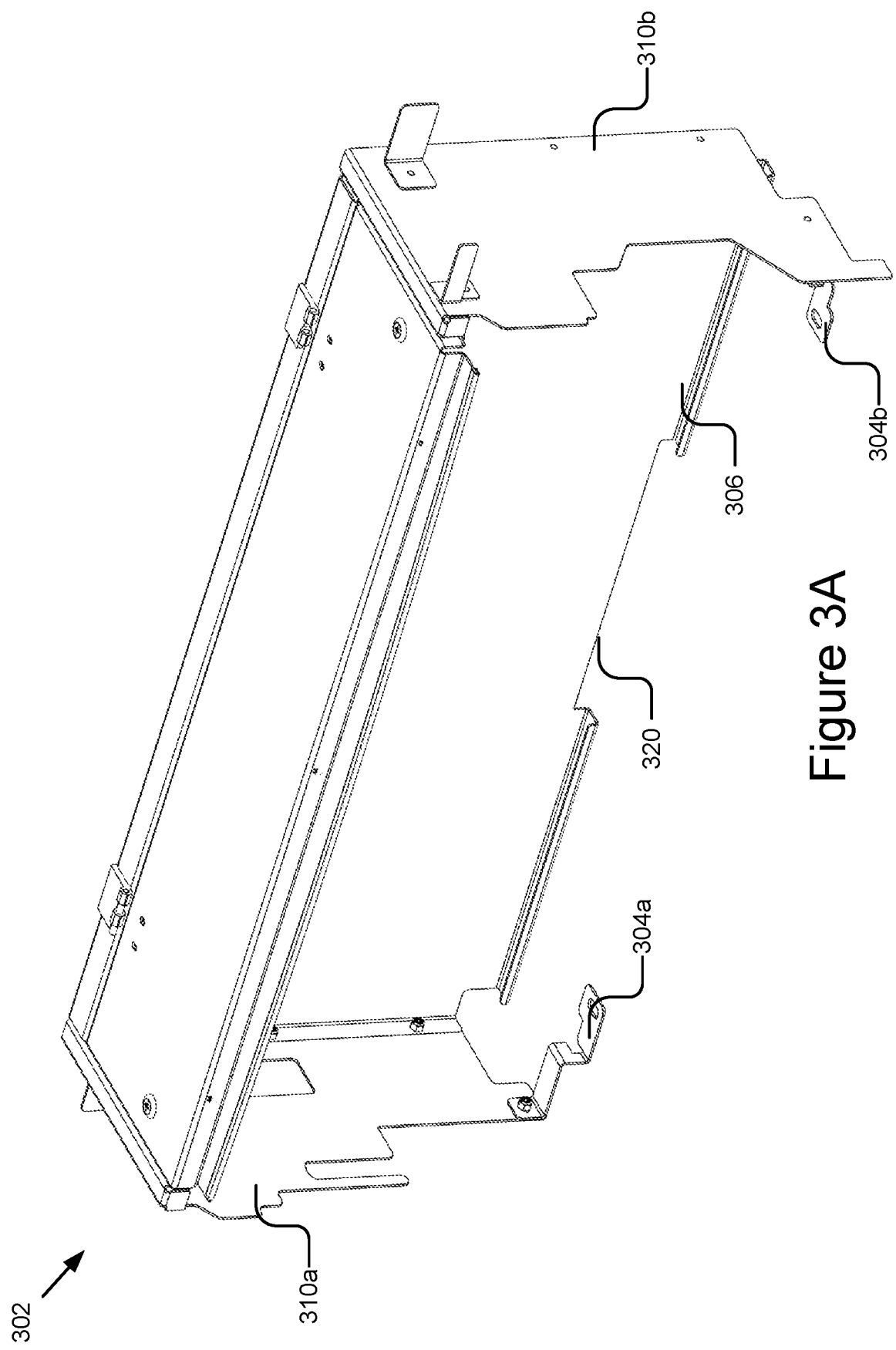
FIGS. 3A and 3B illustrate another example enclosure system.
Figure 3B:
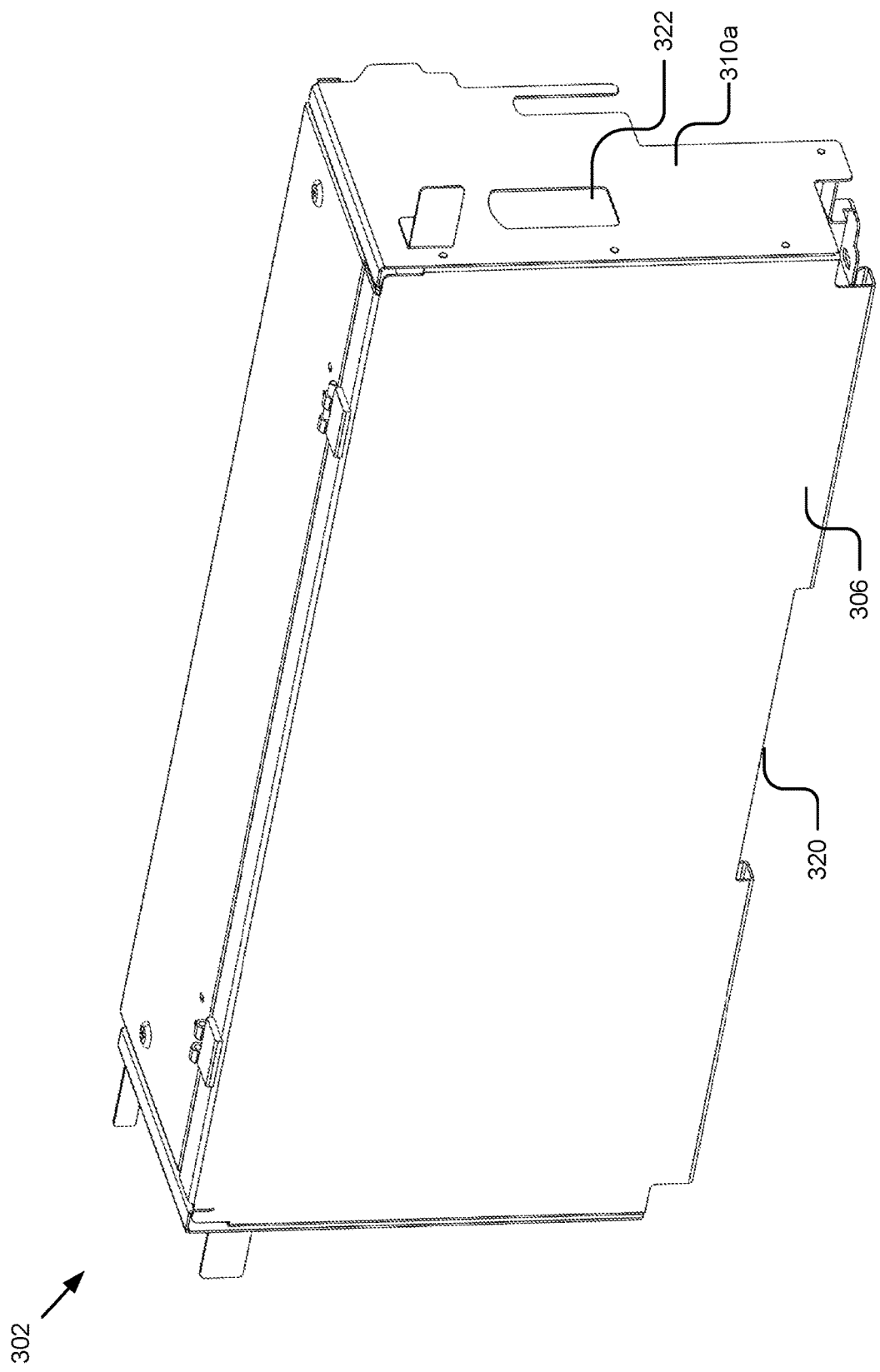

FIGS. 3A and 3B are various views of another example implementation of an enclosure system 302. FIG. 3A is a rear (e.g., facing a rear end of a vehicle 104 when mounted to the vehicle 104) perspective view and FIG. 3B is a front (e.g., facing a front end of a vehicle 104 when mounted to the vehicle 104) perspective view of an example enclosure system 302 for vehicles 104.

The example enclosure system 302 may represent an example implementation of the enclosure systems 102 or 202 described above and features and components of the enclosure systems 102, 202, and 302 may be changed without departing from the scope of this disclosure. For instance, the example enclosure system 302 illustrated in FIGS. 3A and 3B may include some or all of the features described above in reference to FIGS. 1A-2B. The example illustrated in FIGS. 3A and 3B illustrates the adaptability of the enclosure system(s) 102, 202, and/or 302. For instance, the example enclosure system 302 may be used in a JL or JLU Jeep Wrangler® (e.g., 2018-2021), although other implementations are possible and contemplated herein.

As illustrated, the side panels/walls 310a and 310b of the enclosure system 302 include varying contours and cutouts to mount the enclosure system 302 to various vehicle models, types, or years. Similarly, the attachment brackets 304a and 304b may be configured differently to fit different vehicles 104. Additionally, the side walls, lid, etc., may have a different size (e.g., smaller/larger in one or more directions) or shape to match various constraints, such as vehicle dimensions than those described above, for example, in reference to FIGS. 2A and 2B.

As illustrated, the back wall 306 may include a cutout 320 to accommodate for a floor-mounted subwoofer, ridge, or other structure. Similarly, the side panels 310 may include various contours and/or cutouts to match structures or accessories. For instance, a side wall 310 may include a cutout 322 to accommodate a 12-volt power socket, light in a trunk of a vehicle 104, a hinge mechanism, a tailgate catch plate, etc. Similarly, the example enclosure system 302 installed in a vehicle 104 with cutouts and contours matching various features of the vehicle 104.

Figure 4A:
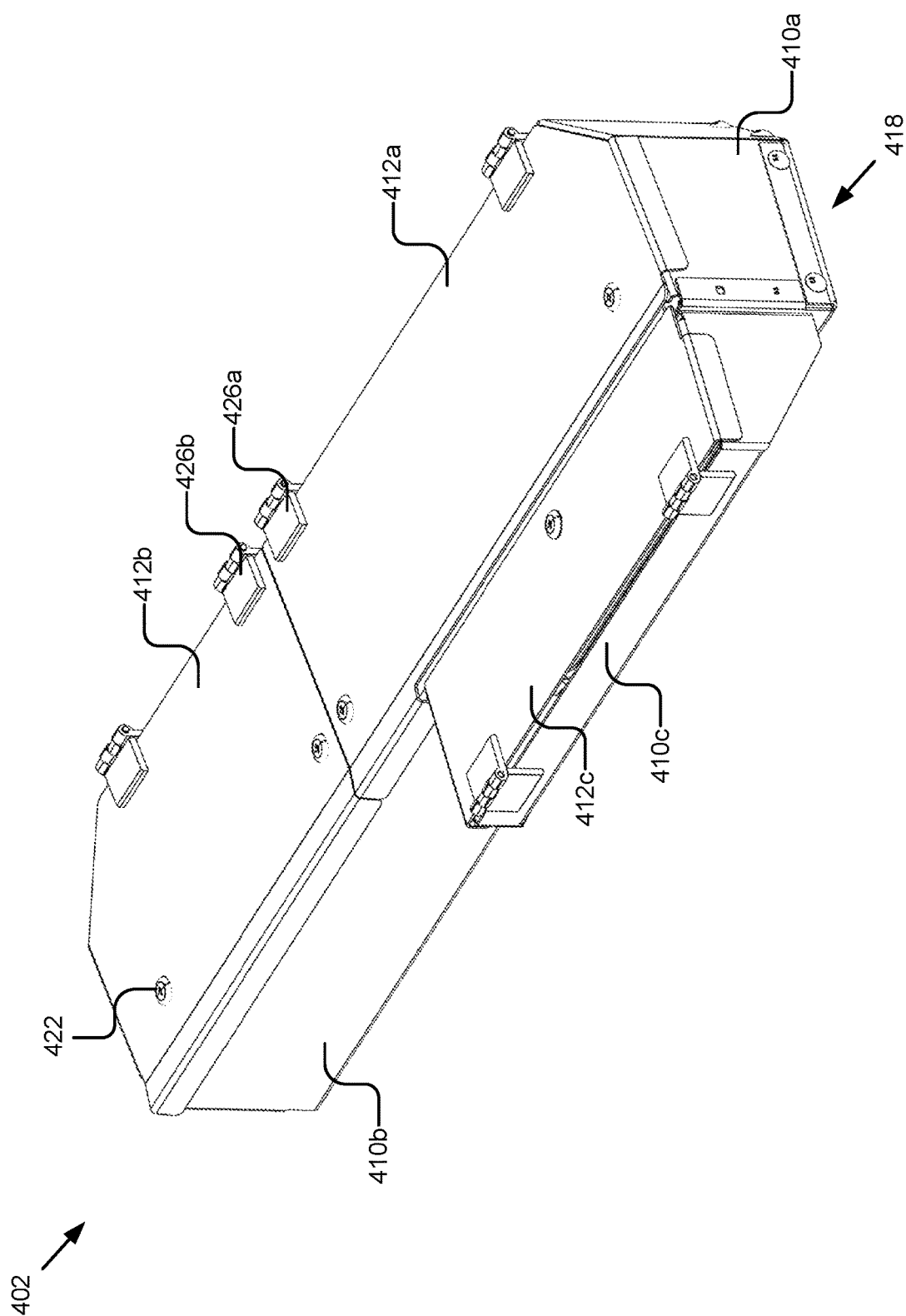
FIG. 4A is a rear perspective view of an example enclosure system.
Figure 4B:
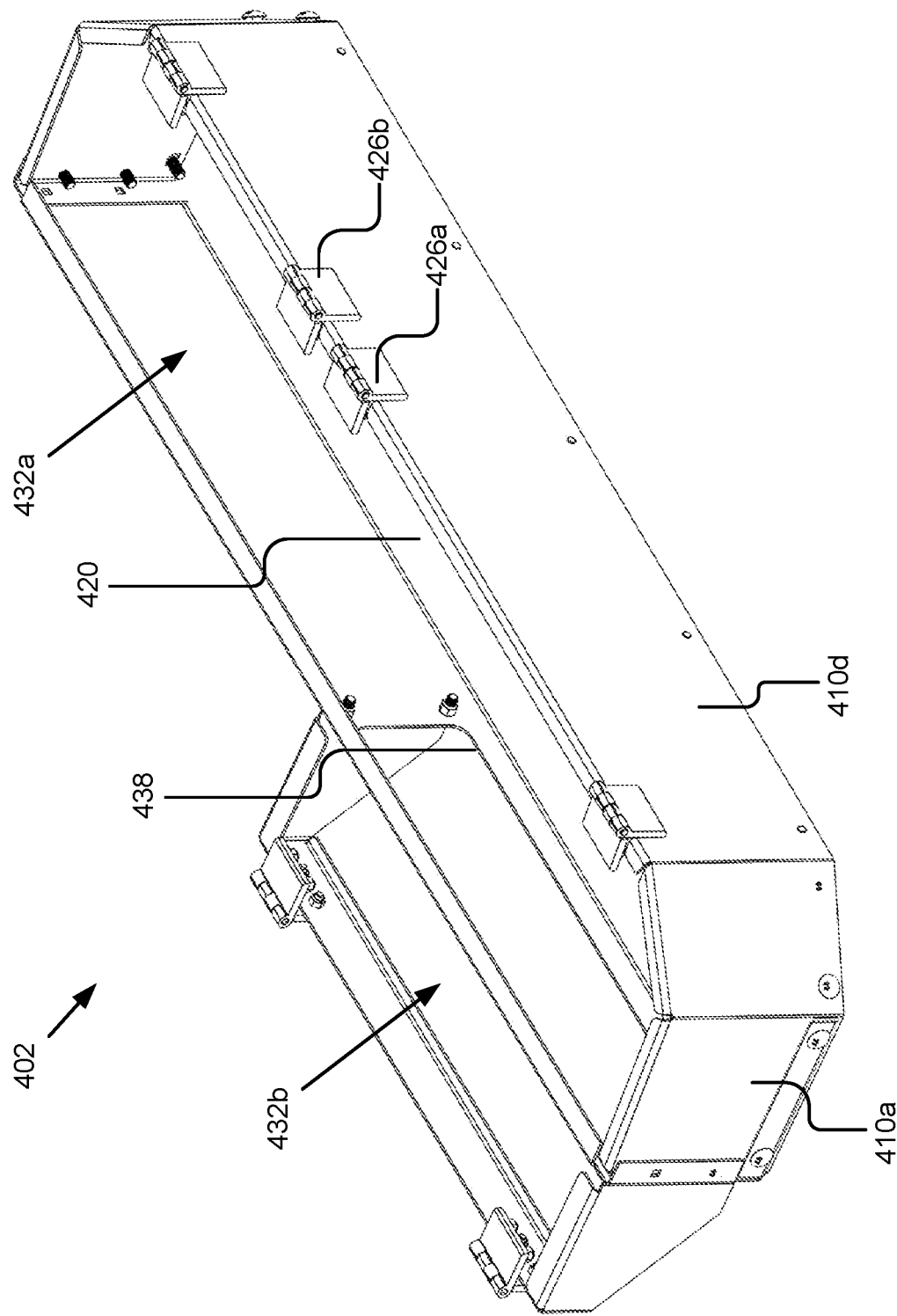
FIG. 4B is a front perspective view of an example enclosure system with doors removed.
Figure 4C:
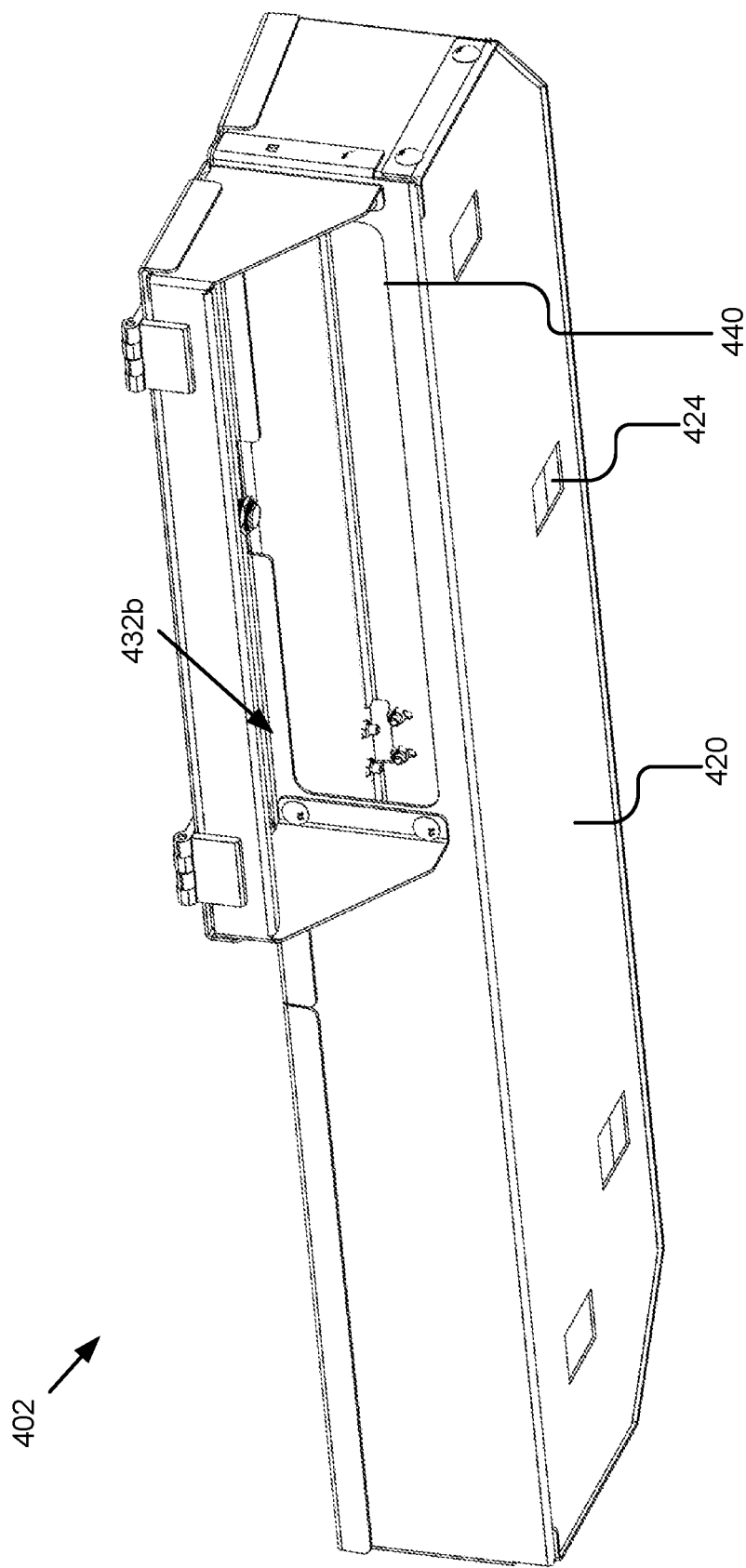
FIG. 4C is a bottom perspective view of an example enclosure system.

FIGS. 4A-4F illustrate various views of an example enclosure system 402 adapted to fit under a seat of a vehicle 104, which may be a seat locker or under-seat storage system. FIG. 4A is a perspective view of a rear/back side of the example enclosure system 402, which may face a rear/back end of a vehicle 104 when the enclosure system 402 is mounted to the vehicle 104. FIG. 4B is a perspective view of a front side of the example enclosure system 402, which may face a front end of a vehicle 104 when the enclosure system 402 is mounted to the vehicle 104. The doors or lids 412a, 412b, and 412c are removed from the illustration of FIG. 4B to illustrate the interior cavity(ies) enclosed by the enclosure system 402. FIG. 4C is a bottom-up perspective view of a back side of the example enclosure system 402.

In some implementations, the enclosure system 402 may include a body 418 including one or more mounting points 424 for mounting the body 418 in a passenger compartment of a vehicle 104, for example, under a seat 444 (e.g., illustrated in FIG. 4F) of the vehicle 104. The body 418 may include one or more walls 410 including a front wall at a front side toward a front side of the vehicle 104, a rear wall at a rear/back side toward a rear/back of the vehicle 104, a left side wall, and a right side wall (e.g., the right and left wall may couple the front and back walls together) toward the left and right sides of the vehicle 104, respectively, for example, when the body 418 is mounted under a seat 444 of the vehicle 104 (e.g., as illustrated in FIG. 4F).

For example, as illustrated in FIG. 4A, the enclosure system 402 may include a body 418 formed by one or more walls 410a, 410b, 410c, and 410d (although other walls are also shown and/or the one or more walls could be continuous) and, in some instances, a floor/bottom 420 (e.g., as illustrated in FIGS. 4B and 4C below). The enclosure system 402 may also include one or more lids/doors 412a, 412b, and 412c, etc., coupled with the body 418. The enclosure system 402 may be mounted underneath a seat and may include latching mechanism(s) 422 in the wall(s) 410 or lid(s) 412 that lock the lid(s) 412 in a closed position. For instance, the enclosure system 402 may provide a secure lock box inside a vehicle 104 in which valuable belongings may be securely stored. In some instances, as described below (e.g., illustrated in FIGS. 4C and 4F), mounting point(s) 424 for coupling the enclosure system 402 to a vehicle 104 may be located within the enclosure system 402, so that the enclosure system 402 may not be accessed or removed when it is locked. The mounting point(s) 424 may include bolts, latches, handles, or various other structures via which the enclosure system 402 may be detachably or permanently attached with the vehicle 104.

In some implementations, the latching mechanism(s) 422 may include one or more locks that lock using a combination, key, or other mechanism there by securely attaching the doors 412 to the body 418. In some implementations, one or more of the doors 412 may include a latch and/or lock at each end of the door (e.g., as illustrated for the doors 412a and 412b in FIG. 4A), thereby improving the security of the door(s) 412, for example, by making it difficult to pry the door open or bend it further from a latching mechanism 422.

As illustrated, the enclosure system 402 may include a body 418 with one or more walls 410 and/or a floor/bottom 420. For instance, the body 418 may include walls 410 bolted together and/or to a base, floor panel 420, or bottom structure, so that the bolts are accessible from the inside of the enclosure system 402. In some implementations, the walls 410 and/or bottom 420 of the enclosure system 402 may be contoured or sized to match the floor of the vehicle 104. For instance, the enclosure system 402 may have a flat bottom and sides that extend past the flat bottom to conform with the floor. In some instances, the enclosure system 402, or a portion thereof, has no floor/bottom, which may instead be formed by the floor of the vehicle 104.

In some implementations, the enclosure system 402 may include one or more lids/doors 412 hinged with the body 418 of the enclosure system 402. For instance, as illustrated, the enclosure system 402 may include two main doors 412a and 412b for accessing the interior (e.g., a first cavity 432a) of the enclosure system 402 and a third lid/door 412c for accessing, for example, a vehicle jack (e.g., in a second cavity 432b), as described below.

In some implementations, the enclosure system 402 may include a jack compartment (although it may allow access to other components, accessories, etc., instead of or in addition to a tire jack) extending over a jack mounting point (e.g., of the vehicle 104 and/or enclosure system 402) that allows the jack to be locked inside the enclosure (e.g., in a second cavity 432b) and/or accessed via the door 412c. For instance, the jack enclosure may be shaped to enclose the jack and may have an open bottom through which the jack may be accessed. The jack enclosure may include its own door 412c and/or the body/wall 410 of the enclosure system 402 may include a passage or aperture 438 through which the jack or second cavity 432b may be accessed from inside the enclosure system 402. Similarly, the aperture 438 may also allow larger or wider objects to be placed inside the enclosure system 402.

Figure 4D:
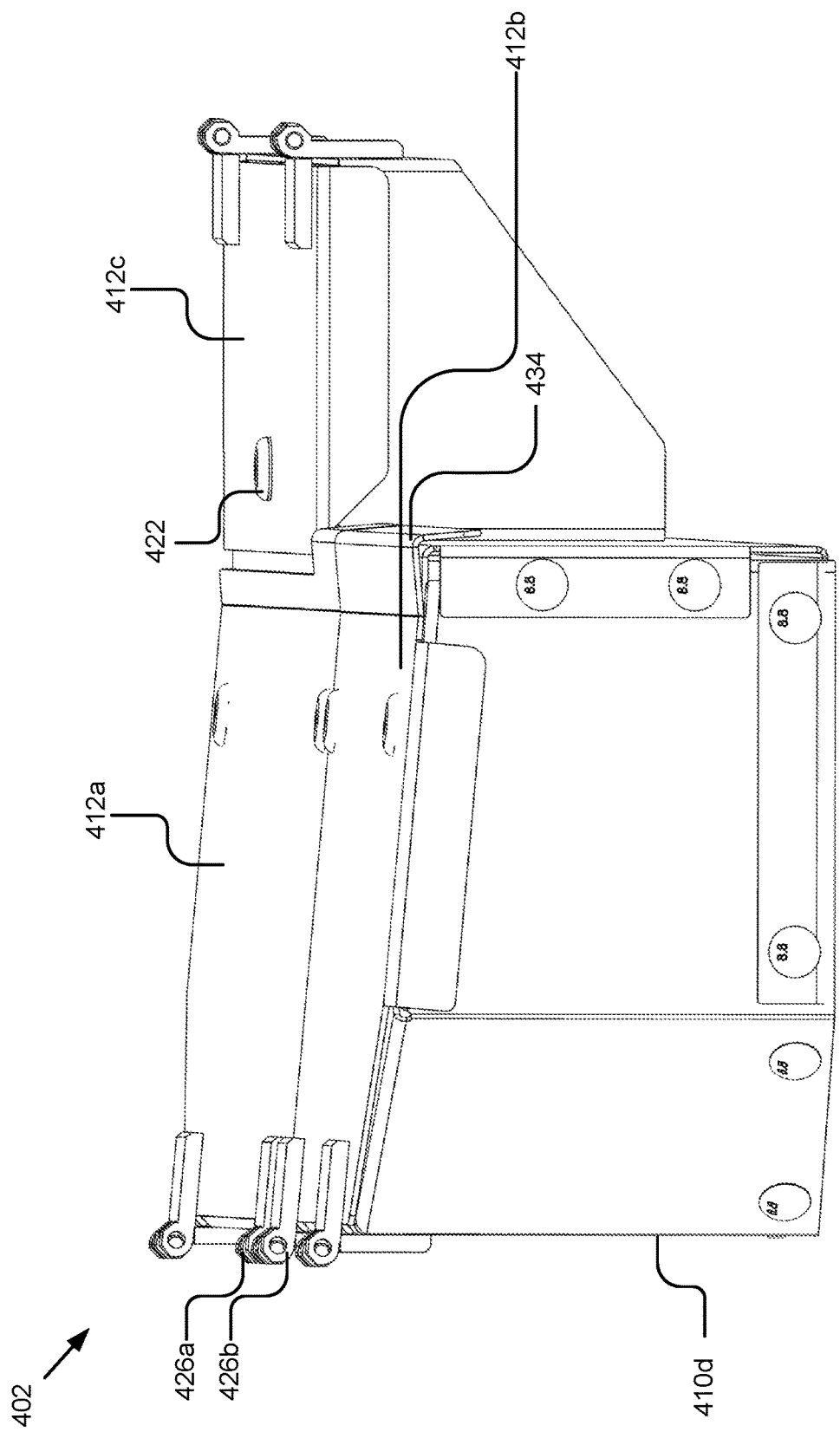
FIG. 4D is a side view of an example enclosure system.

FIG. 4D is a left side view (e.g., viewed from a left side of the vehicle 104 when mounted to the vehicle 104) of the example enclosure system 402, although the enclosure system 402 may be a mirror image of that illustrated or include other configurations without departing from the scope of this disclosure.

As illustrated, in some implementations, the doors 412a and 412b may be coupled with the body 418 using one or more hinges 426a and 426b located near a front of a seat of the vehicle 104, so that the lid(s) pivot opposite to the seat when the seat is lifted, although other implementations are possible. For instance, if a vehicle seat does not lift/pivot to be completely vertical (e.g., as illustrated in FIG. 4F), a door 412a may be opened forward (e.g., at a 90, 120, or 270 degree angle from closed), so that the lid may remain open (e.g., not falling due to a less-than vertical position of the seat) without using struts or coupling it to the seat bottom, although these features are additionally or alternatively possible. In some implementations, other mounting mechanisms for coupling the doors 412 with the body 418 are possible and contemplated herein, for instance, instead of or in addition to the hinge(s) 426, the mounting mechanisms may include bolts, latches, quick release pins (e.g., as described above), or other mechanisms for permanently or detachably coupling the door(s) with the body 418 (e.g., with one or more walls 410).

In some implementations, each lid or door 412 may have an edge 434 that is bent (e.g., in plate metal forming the door 412), formed in its material, or attached thereto, to increase its rigidity. The door 412a and 412b may each include one or more locks/locking points to secure the doors 412 in a closed position. In some instances, the door(s) 412 may be angled to follow the angle or structure of the seat under which the system is mounted in order to increase space internal to the enclosure system 402.

As illustrated in the example implementation, a first door 412a and/or a second door 412b may be coupled with the walls 410 at a top edge of a front wall 410d using hinge(s) 426a and 426b. For instance, an edge of a door 412 may pivot about an axis formed by a hinge 426 coupled with a wall 410. When the one or more doors 412 are in a closed position (e.g., as illustrated in FIG. 4D), the door(s) 412 may close over a top of the body 418 thereby forming a first cavity 432a (and/or two separate cavities separated by a divider wall).

In some implementations, as illustrated in FIG. 4D, the first door 412a and 412b may pivot forward toward a front side of the enclosure system 402 and a corresponding front end of a vehicle 104 using the hinges 426a and 426b. In some implementations, one or more side walls 410 and/or other structures may be sloped upward to match a slope of a bottom surface of a vehicle seat 444 when the seat 444 is in a downward position. The slope may increase space in the enclosure system 402 and/or provide increased rigidity. For example, the angle between a front wall 410d and a first (and/or second) door 412a may be acute to form the slope. It should be noted that other implementations and configurations are possible and contemplated herein. For example, the door(s) 412 may be level, plumb, or at any angle, they may open toward a rear end of the vehicle 104, they may open toward a side of the vehicle 104, there may be different quantities or shapes, or other configurations are possible.

In some implementations, the first and/or second doors 412a and 412b may slope upwards toward a front side of the enclosure system 404, while a third door 412b may be substantially level and/or open in an opposite direction (e.g., pivoting toward a back end of the vehicle 104 while the doors 412a and 412b pivot toward a front of the vehicle 104). It should be noted that the doors 412 may open sideways, slide open, be removed completely, or other implementations are possible.

Figure 4E:
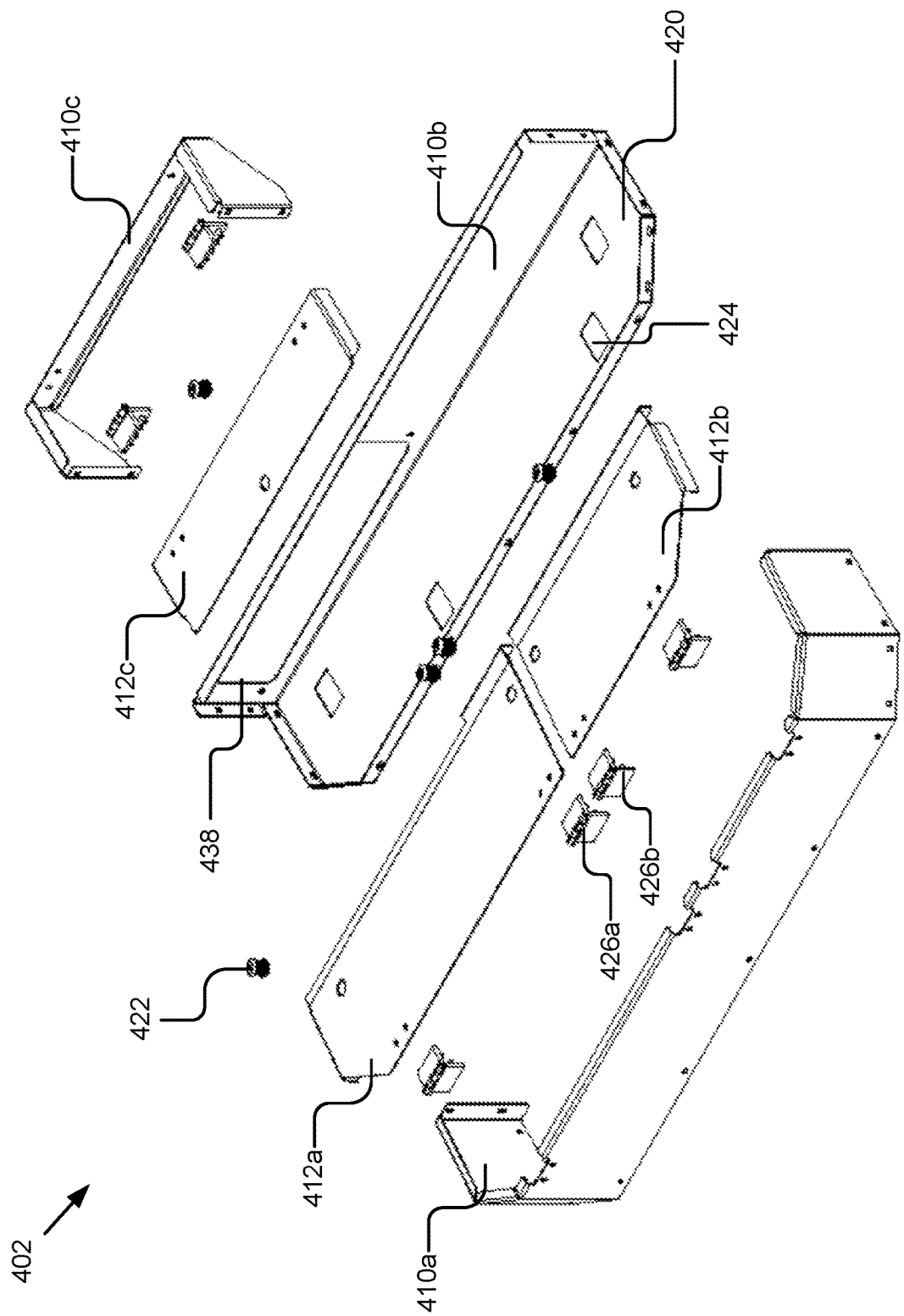
FIG. 4E is an exploded view of an example enclosure system.
Figure 4F:
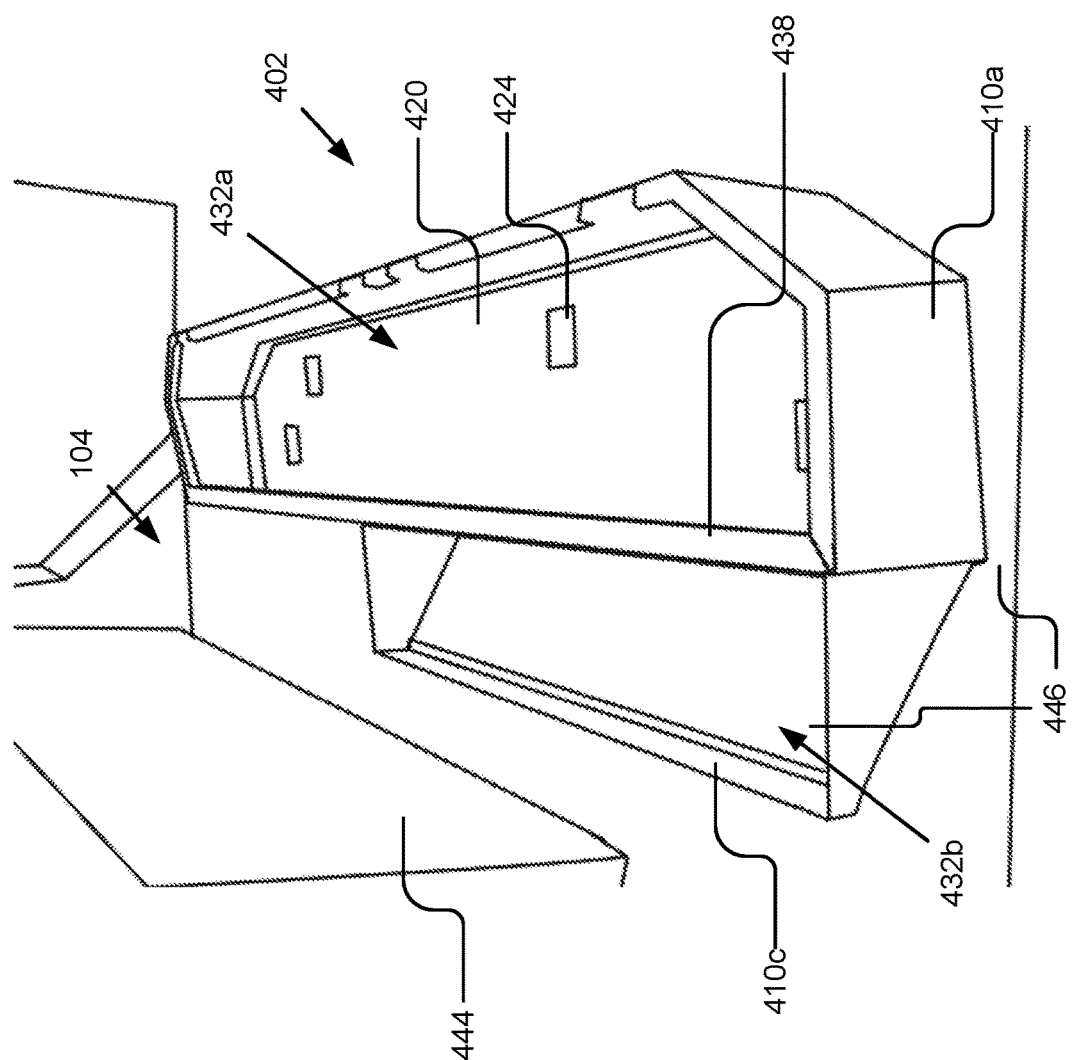
FIG. 4F is an illustration of an example enclosure system mounted to an example vehicle.

FIG. 4E is an exploded view of the example enclosure system 402, which illustrates some or all of the components of the example enclosure system 402. Depending on the implementation, one or more components (e.g., walls 410, doors 412, floor panel 420, etc.) may be formed from bent sheet metal, which may have bends, channels, bars, or reinforcements at edges, corners, midpoints, or elsewhere for providing additional strength. Other construction materials and methods are also possible and contemplated herein. For instance, one or more of the components of the enclosure system 402 may be constructed from plastic (e.g., a strong plastic, such as acrylic, polycarbonate, polypropylene, etc.), carbon fiber, wood, or other materials. As illustrated in FIG. 4E, the walls 410 and/or doors 412 of the enclosure system 402 may have one or more bent portions that provide rigidity/strength to the walls, mounting points for hinges, support for the lid(s), and/or connection points for the lock(s).

In some implementations, the hinges 426 may be configured so that they cannot be detached from externally to the enclosure system thereby providing further security (a similar hinge may also be used in the enclosure systems referenced above), for example, using carriage bolts, rivets, adhesive, welds, covered bolts or screws, etc. Similarly, the walls 410 and/or bottom 420 may be assembled so that they cannot be disassembled from external to the enclosures system 402 using the same or similar means.

In some implementations, the floor panel 420 may be coupled with a rear wall 410b. For example, the floor panel 420 may be attached or formed together with the rear wall 410b, for instance, from a single bent sheet of metal. In some instances, the floor panel 420 may not cover an area below the third door 412c thereby exposing a floor 446 of the vehicle 104, which may allow mounting points (e.g., for a jack or other accessory) of a vehicle 104 to be accessed from inside the second cavity 432b, as illustrated in FIG. 4F.

FIG. 4F is an illustration of the example enclosure system 402 mounted to an example vehicle 104, for example, with a seat 444 of the vehicle 104 folded upwards to provide access to the example enclosure system 402. For instance, various vehicles 104, such as the Jeep Gladiator® (e.g., model JT) have a rear seat that lifts upward to allow items to be stored under the seat. Many vehicles 104 provide an opening under a rear seat 444, such as a folding bench seat, but the vehicles 104 do not include secure storage in this space.

As illustrated in FIG. 4F, an example enclosure system 402 is mounted to a vehicle 104; although, FIG. 4F does not illustrate doors 412 coupled with the walls 410, which may be coupled as described elsewhere herein. Additionally, as shown, the floor 420 of the body is mounted to the floor 446 of the vehicle 104 with various cutouts (e.g., corresponding to mounting points 424 of the enclosure system 402) or vehicle mounting points in the vehicle 104. For instance, mounting points 424 may be located in a floor/bottom 420 of the enclosure system 402.

In some instances, as illustrated, a bottom or side of the second cavity 432b (e.g., a jack compartment) may be open to allow access to a factory mounting point for a jack or other accessory, structure, or component. For example, a floor 446 of the vehicle may be exposed within the second cavity 432b.

One or more of the walls 410 may include a bend 440 that provides strength to a door 412 and/or a latching point for a latching or locking mechanism 422 that locks the door(s) 412 in a closed position.

It should be noted that other implementations or features of the enclosure system 402 are possible and contemplated. For instance, the enclosure system 402 may include one or more features of the enclosure systems (e.g., 102, 202, 302) illustrated and described in reference to elsewhere herein. The enclosure system 402 may include various quantities and configurations of walls 410, doors 412, etc., without departing from the scope of this disclosure. Similarly, in some implementations, the enclosure system 402 may include various accessories mounted to its top or sides, such as pockets, cupholders, accessory mounting points, etc.

Figure 5A:
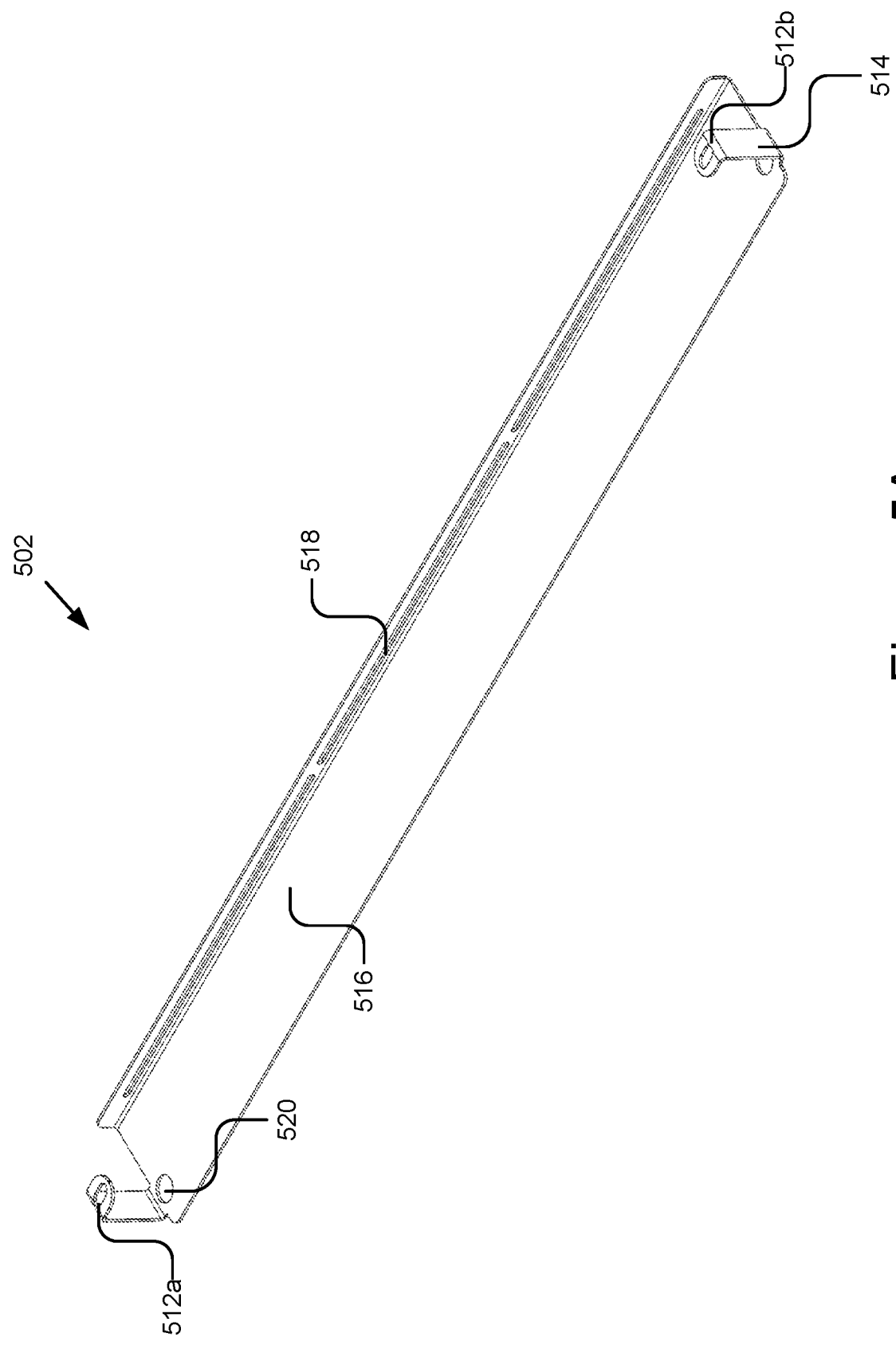
FIGS. 5A-5C illustrate an example visor shelf system.
Figure 5B:
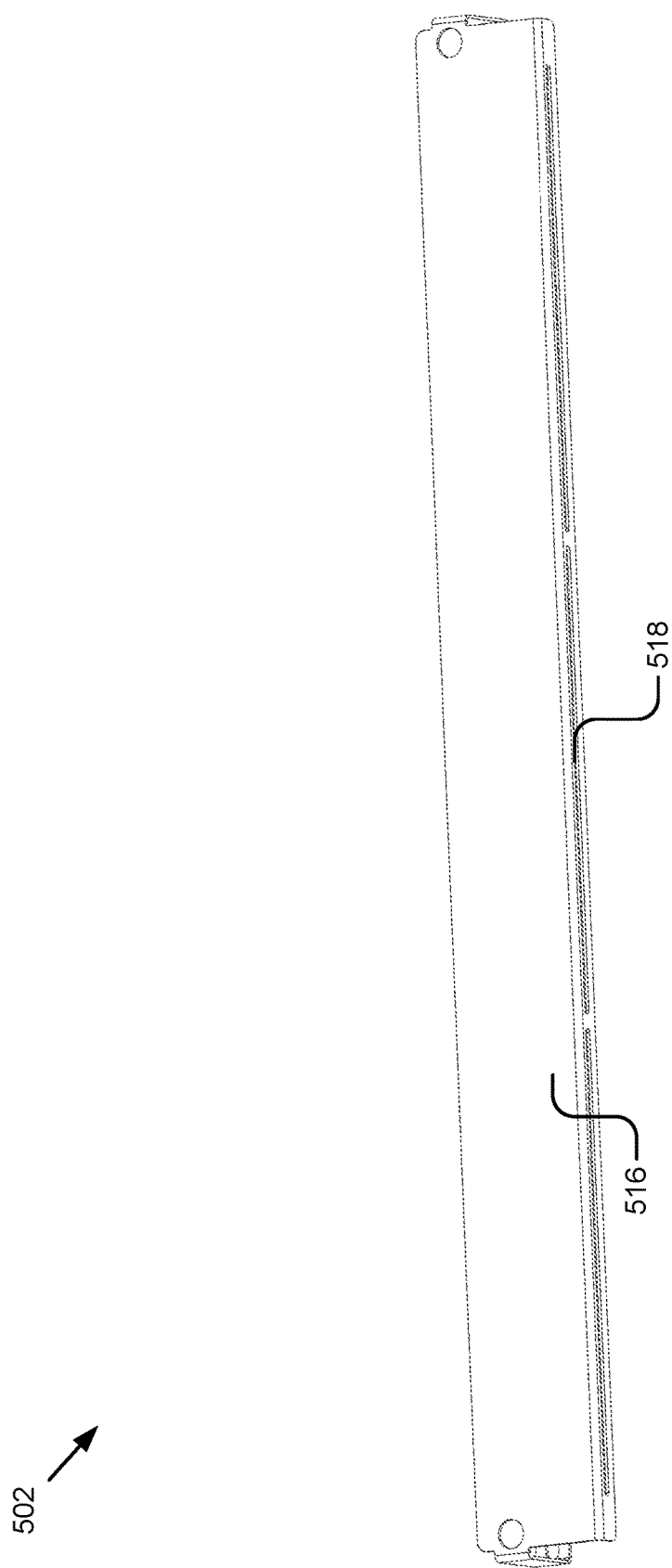

FIGS. 5A-5D are various views of an example accessory mounting system 502 (referred to herein as visor shelf 502), which may be mounted next to one or more windshield visors adjacent to a windshield of a vehicle 104. FIG. 5A is a perspective, top-down view of an example visor shelf 502 decoupled from a vehicle 104. FIG. 5B is a bottom-up view of an example visor shelf 502.

For example, the visor shelf 502 may include mounting points 512a and 512b located at each end and/or at a center. For example, a mounting points 512 may include a post 514 that extends upward (e.g., 1-4 inches, 2.5 inches, etc.) from the visor shelf to mount to factory bolts or mounting points of the vehicle 104. In some implementations, the visor shelf 502 may mount to visor mounting points (e.g., where a visor 536 mounts to a vehicle 104), use tension to mount between vehicle A pillars, use adhesive or suction, and/or mount to the rear-view mirror 534, etc., although other mounting methods are possible and contemplated herein. The visor shelf 502 (e.g., a flat shelf area 516 and/or a post 514) may include one or more pass-throughs 520 that allow a screwdriver, wrench, mounting mechanism, or other device to pass through, for example to allow the visor shelf 502 to be more easily mounted to a vehicle 104.

In some implementations, the visor shelf 502 may include a flat shelf area 516, the one or more vehicle mounting points 512, and one or more accessory mounting points 518. The flat shelf area 516 may be substantially level when mounted to the vehicle 104 and objects or mounting structures may be placed, attached, or integrated into the flat shelf area 104. For instance, the shelf area 516 may include a GoPro® mount, perforations, Velcro™, magnets, etc., using which accessories may be mounted on top of, underneath in front of, behind, or otherwise using to the visor shelf 502.

In some implementations, the visor shelf 502 may have various mounts attached or integrated therein that are adapted to hold sunglasses, a GoPro® camera, a dash camera, a heads-up display, a smartphone, and/or other devices. For example, the visor shelf may include, or have integrated therewith, a lightbar, accessory power strip, or sunshade (e.g., pulling up or down from, sliding across, or attaching to the visor shelf), although other implementations are possible and contemplated herein.

In some implementations, a structure of the visor shelf 502 may include a 90-degree (or other angle) bend to provide rigidity to the visor shelf 502. The bent (e.g., a vertical, when mounted to a vehicle) or attached surface/ structure/wall/portion of the visor shelf 502 may include accessory mounting points 518. For instance, as illustrated, the vertical portion of the shelf system may include slots 518 into which items may be attached. For instance, the slots 518 may allow a Velcro™ strap to pass through and be used to adjustably attach objects to an under side of the flat shelf area 516 (although, the shelf area 516 may have contours and does not need to be flat).

The visor shelf 502 may have various widths, heights, or lengths to accommodate various vehicles or implementations. For example, the size may match a visor size or otherwise be configured to avoid blocking the windshield. Similarly, the length may vary or adaptable for various vehicle widths. In some instances, the visor shelf 502 may include one or more contours or cutouts to allow it to be mounted around a rear-view mirror, visor, curved windshield, or other vehicle structure.

The visor shelf 502 may be made from one or more materials depending on the implementation. For instance, the visor shelf 502 may be made from metal to provide strength and/or a magnetic mount. Some or all of the visor shelf 502 may be made from glass, acrylic, etc., that is clear or tinted, so that it does not block visibility of the windshield. In some implementations, the visor shelf 502 may be stamped and/or bent steel or aluminum.

Figure 5C:
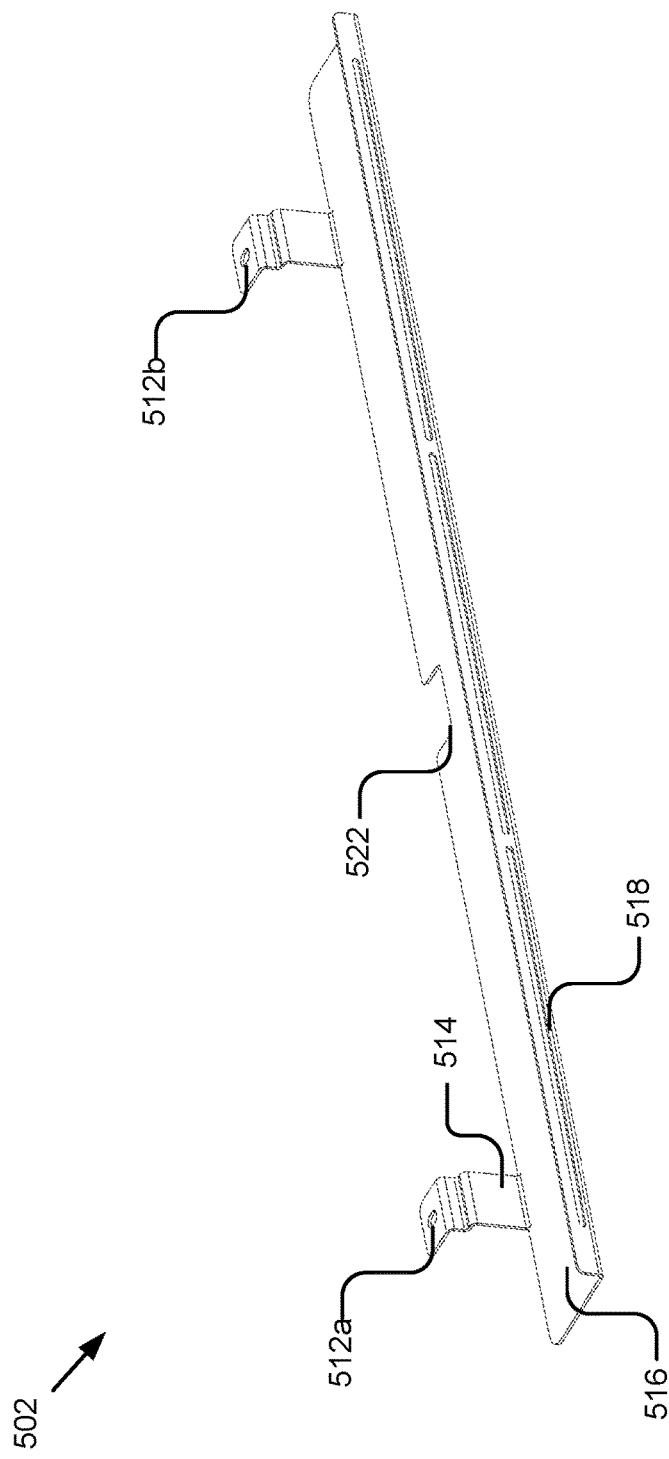

FIG. 5C is a perspective view of an example visor shelf 502. As illustrated, the mounting mechanisms may have various configurations, to allow the visor shelf 502 to be attached to different vehicles with different mounting points, for example, to visor mounts, roof mounts, etc., of a vehicle 104. As illustrated, the visor shelf 502 may additionally or alternatively have one or more cutouts 522 or contours, so that the visor shelf 502 does not interfere with a rear-view mirror or other component of the vehicle 104.

Figure 5D:
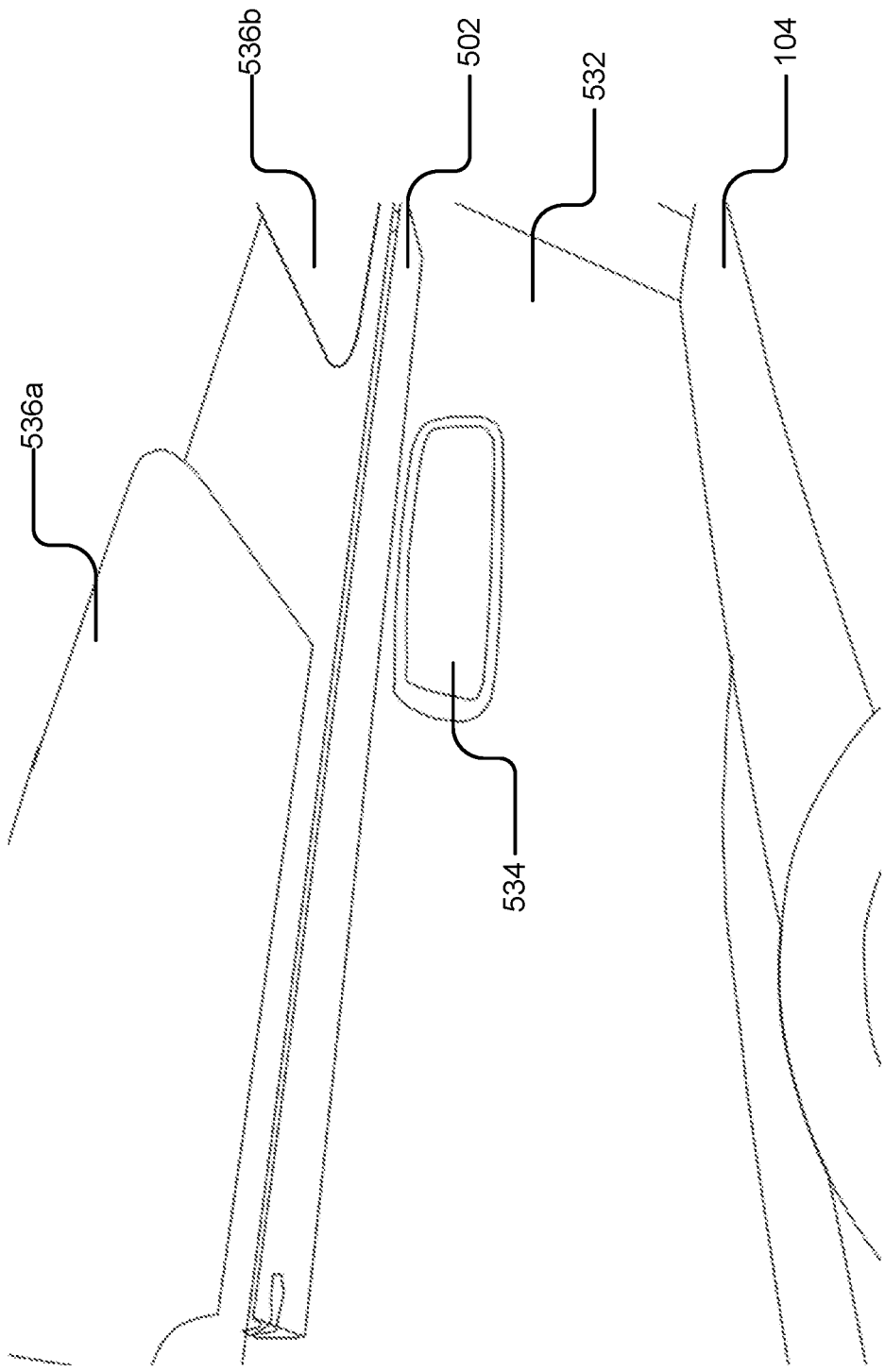
FIG. 5D illustrates an example visor shelf system mounted to an example vehicle.

FIG. 5D illustrates an example visor shelf 502 mounted to a vehicle 104. The visor shelf 502 may mount to/adjacent to a windshield or visor area inside a vehicle 104 (e.g., a Jeep Wrangler® or other vehicle), such as inside the vehicle 104 near the windshield 532. For instance, the visor shelf 502 may sit between a rear-view mirror 534 and the windshield 532 or vehicle visors 536a and 536b to provide an upper mounting space for various accessories, such as cameras, switches, etc. For example, the visor shelf 502 may be a platform to which various accessories and functional components may be mounted.

Various accessories, such as a GoPro® camera, dash camera, storage bag, sunglass holder, smartphone showing a map or vehicle speed, vehicle accessory switches, garage door opener, first aid kit, light, or other items may be attached to the visor shelf 502.

Figure 6:
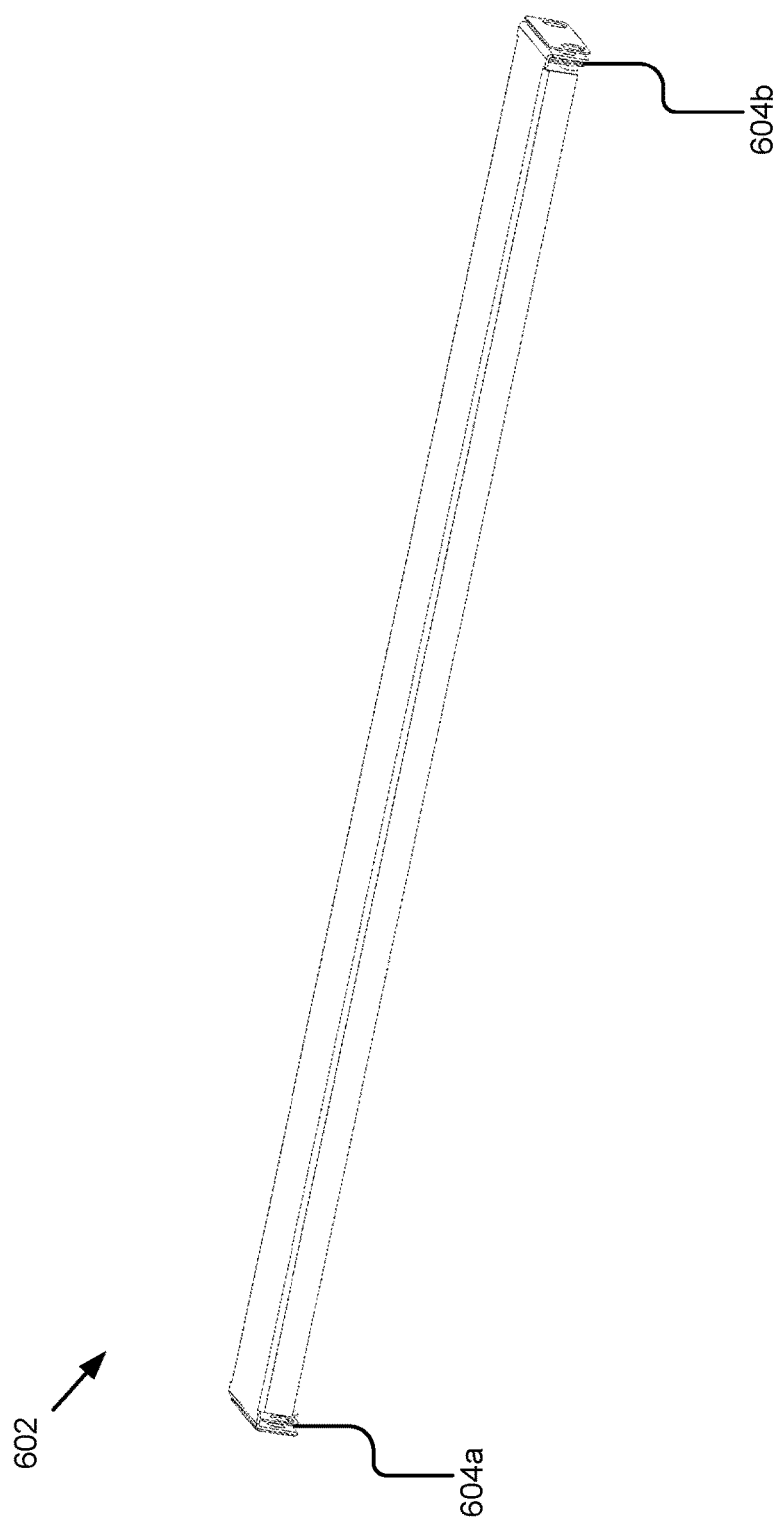
FIG. 6 illustrates an example rack rail.

FIG. 6 is a perspective view of an example rack rail 602 for mounting accessories, for example, to an enclosure system (e.g., 102, 202, or 302). For example, a rack rail 602 may connect to a top or bottom side of the enclosure system 102 and provide an additional mounting point at which items may be attached. The rack rail 602 may be an elongated bar with bends and/or a nut-plate channel along its length, which may be used to attach brackets, items, storage, etc.

In some implementations, the rack rail 602 may include 90-degree bends at each end via which the rack rail 602 may be mounted to the enclosure system 102. For example, the rack rail 602 may be mounted across using tie down brackets 114 coupled to the top and/or bottom of the enclosure system 102. For instance, a first end of the rack rail 602 may be attached to a first tie down bracket 114a and a second end of the rack rail 602 may be attached to a second tie down bracket 114b. The rack rail 602 may be attached to any of the holes or connection points of a tie down bracket or molle panel to allow items or storage to be mounted to any point along the top or bottom of the enclosure system to provide forward-backward adjustability. Similarly, items may be placed anywhere along the nut-plate channel to allow side-to-side adjustability of where items may be mounted to the rack rail 602.

In some implementations, the rack rail 602 may include one or more channels 604a and 604b into which the tie down brackets 114 may be inserted, so that the rack rail 602 may slide along the tie down brackets 114. Bolts, quick release pins, or other fastener(s) that couple the rack rail 602 to the tie down bracket(s) 114. The rack rail 602 may thereby hold items in various positions relative to the enclosure system and/or vehicle 104.

Figure 7A:
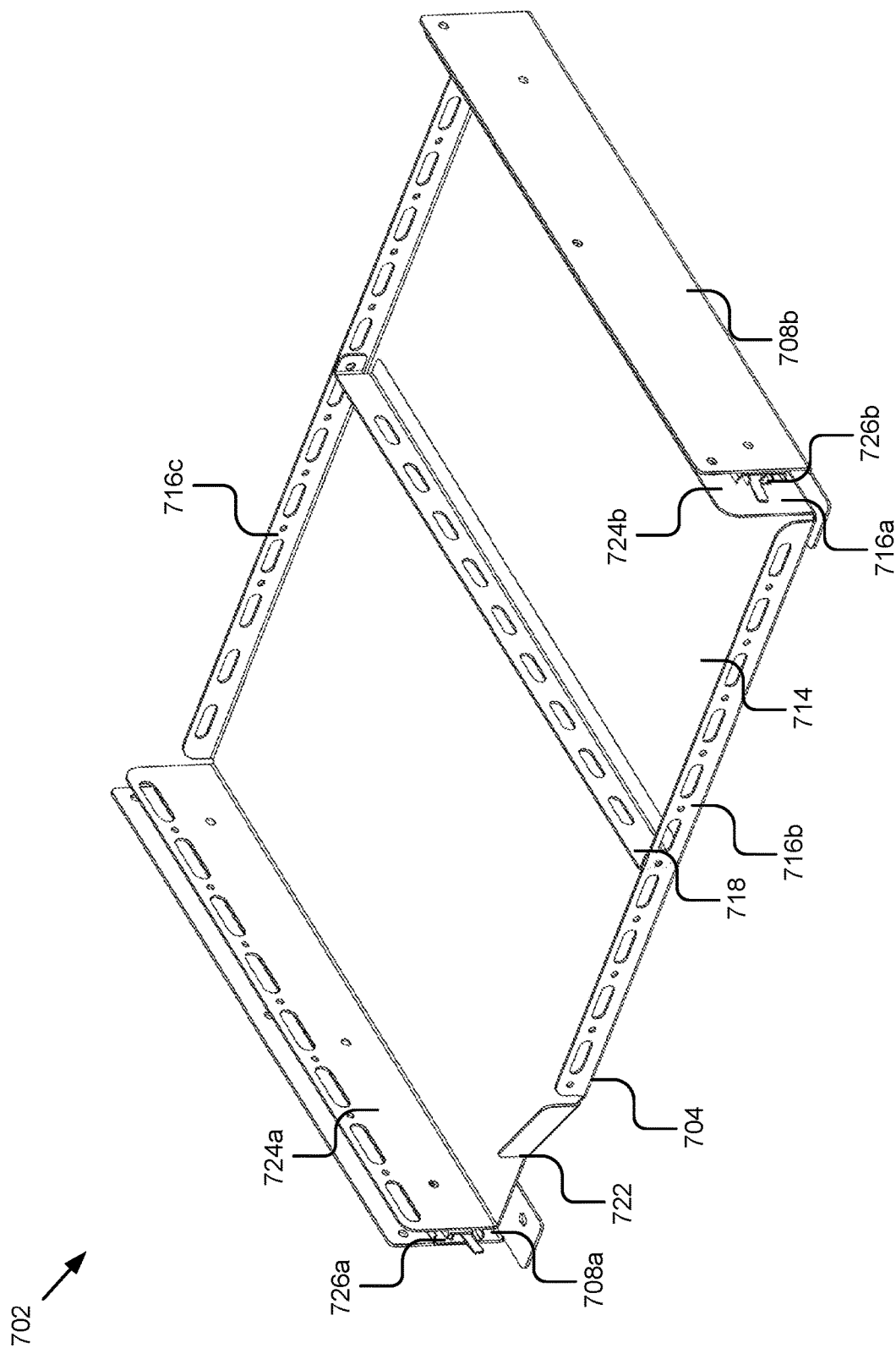
FIG. 7A illustrates an example sliding table system.
Figure 7B:
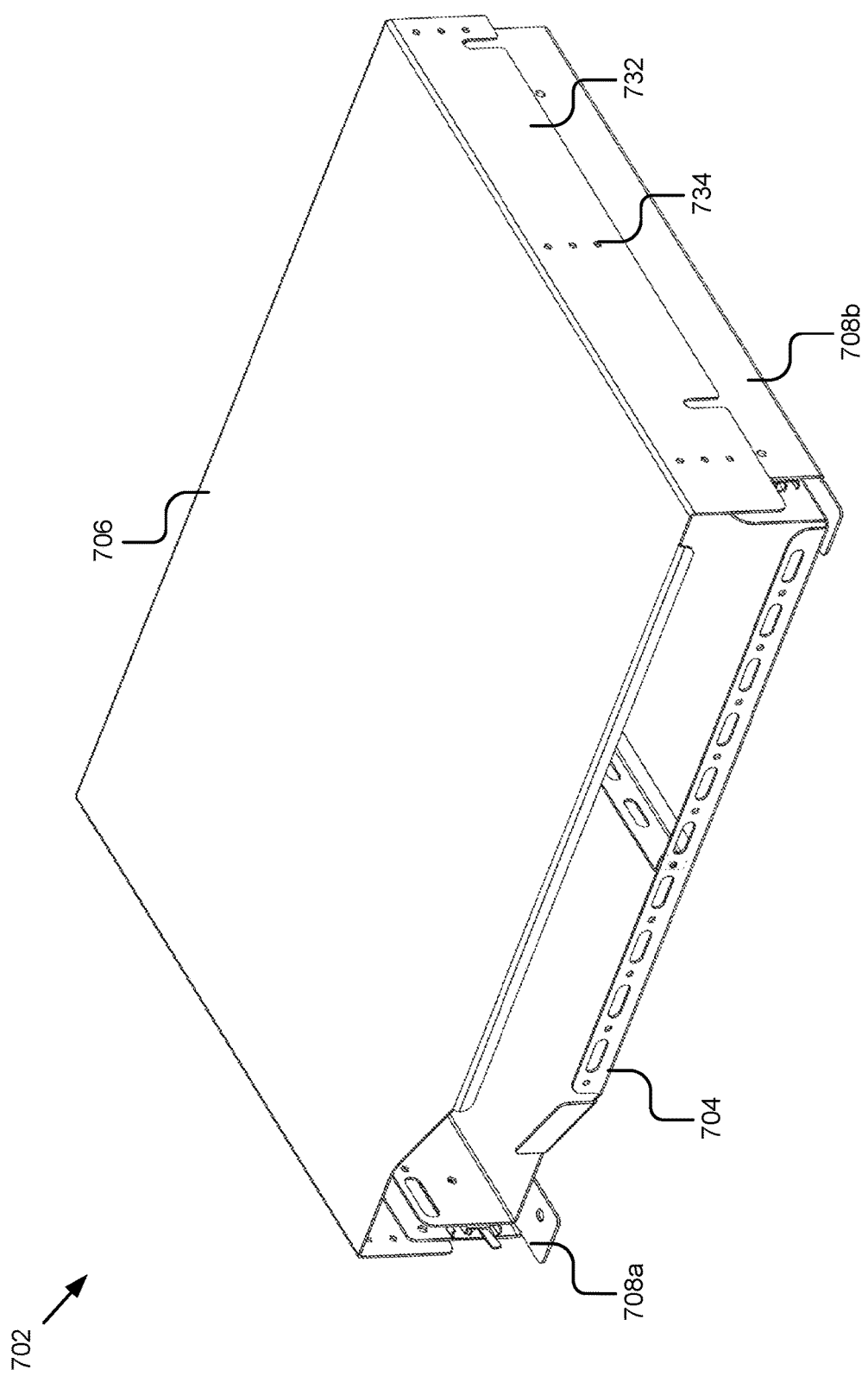
FIGS. 7B-7D are perspective views of an example sliding table system with a shelf.
Figure 7C:
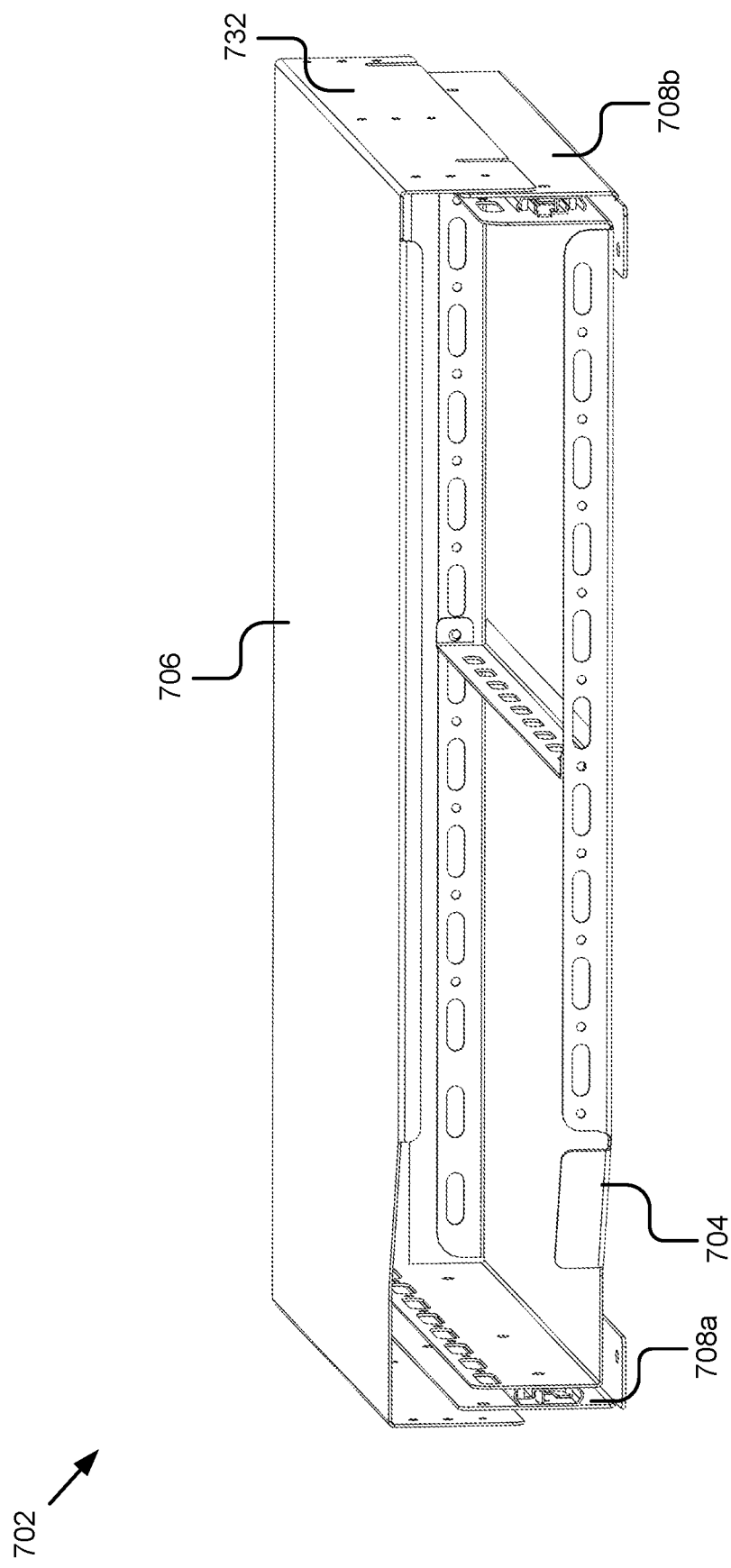
Figure 7D:
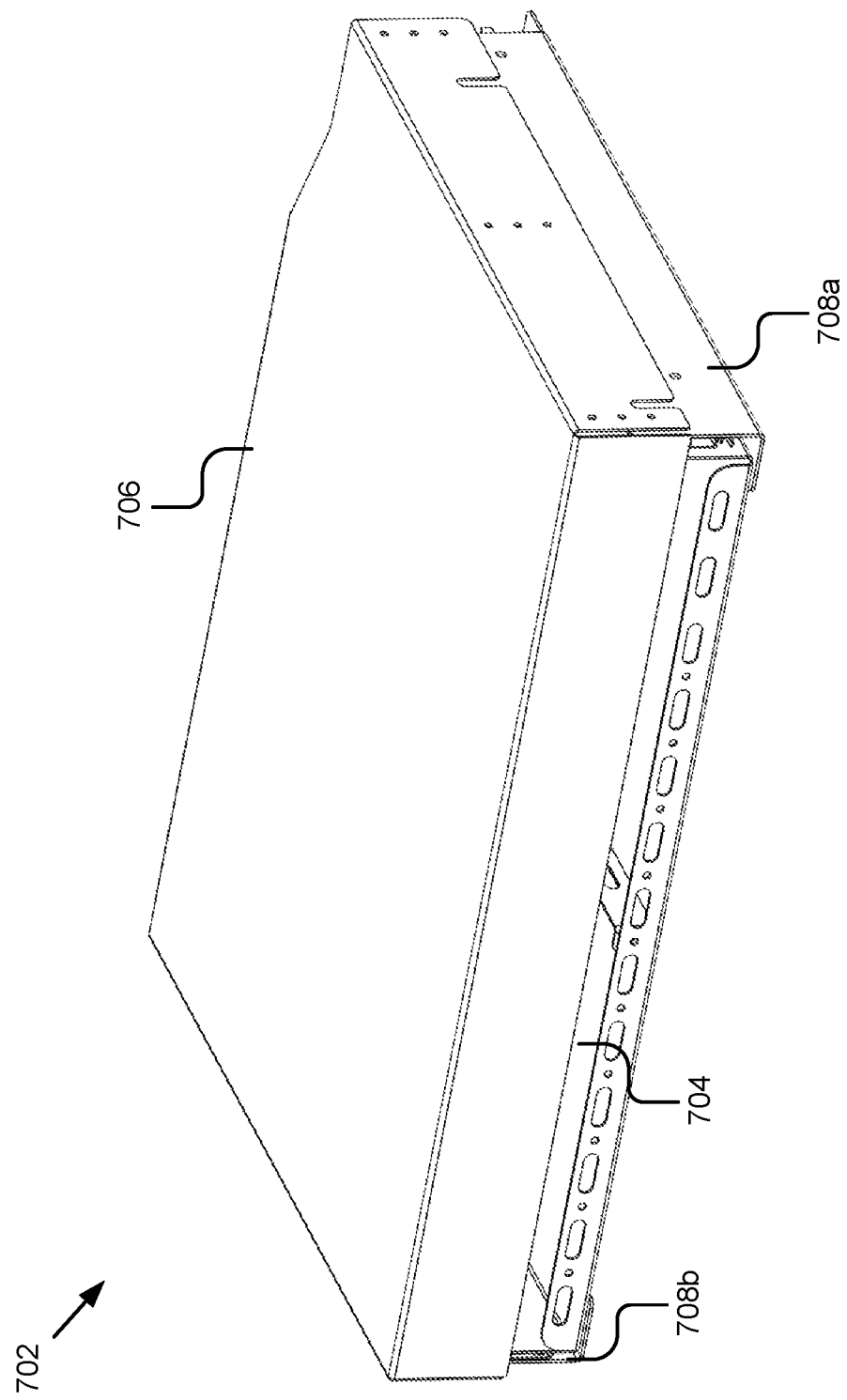
Figure 7E:
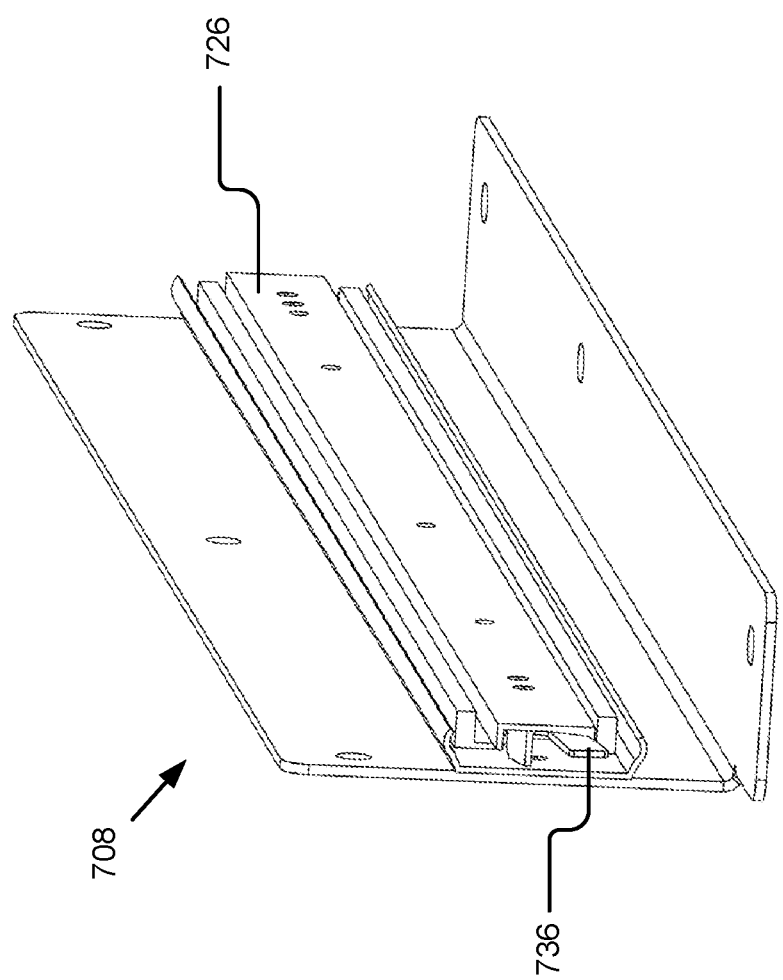
FIG. 7E illustrates an example support bracket for a sliding table system.
Figure 7F:
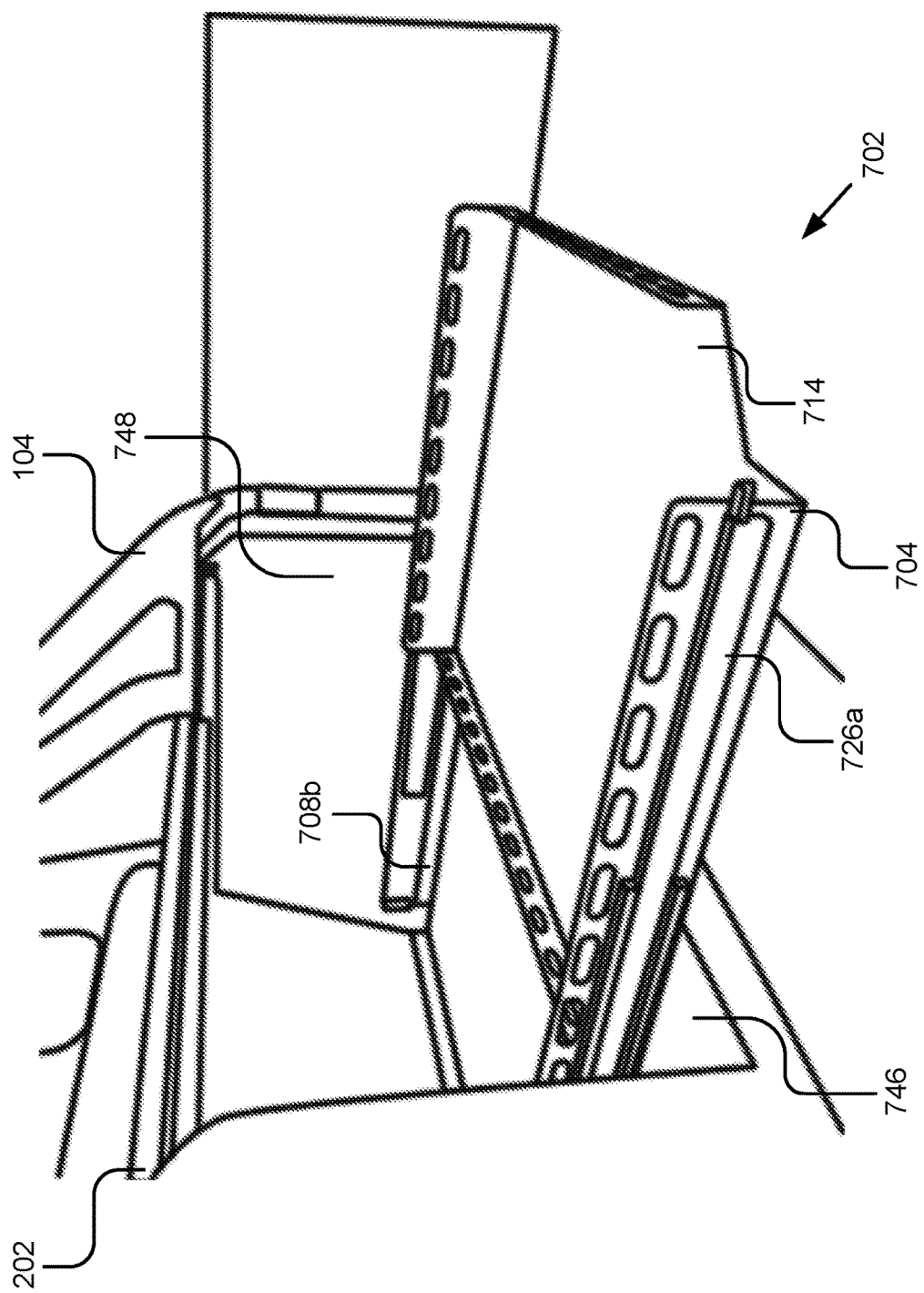
FIG. 7F illustrates an example sliding table system mounted to an example vehicle and in an extended position.

FIGS. 7A-7F illustrate various views of an example sliding table system 702. FIG. 7A illustrates a perspective view of an example sliding table system 702 and FIG. 7B illustrates a perspective view of an example sliding table system 702 with a shelf 706. FIG. 7C illustrates a front-on view of the sliding table system 702 with a shelf 706. The example sliding table system 702 is shown from a front side of the system 702 from which the table 704 may slide outwards. For example, the table 704 may slide outwards from a trunk, front trunk, bed, or rear of a vehicle 104, as illustrated in FIG. 7F. For example, the sliding table system 702 may provide a work surface and/or easily accessible storage, as illustrated. In some implementations, the sliding table system 702 may be used in conjunction with and/or coupled with an enclosure system, such as 102, 202, 302, or 402 described above.

As illustrated, a sliding table system 702 may include a table 704 (also referred to as a table member 704 or sliding table 704) that is supported by one or more support brackets 708a and 708b. For instance, the table member 704 may include a top surface 714 upon which items may be placed or attached and one or more reinforcing structures 716a, 716b, and 716c (although other structures are illustrated but not labeled). The table member 704 may also include a center divider 718 that provides additional strength. The reinforcing structures 716 and/or divider 718 may also serve as walls that prevent items from moving across the table surface 714 and/or falling off the surface 714. The reinforcing structures 716 may also include various bolt holes, apertures, and other structures for connecting accessories, as described below.

In some implementations, the table surface 714 may be formed from stamped aluminum or steel, although other materials are possible. For instance, the table surface 714 may be ⅛$^{th}$ inch aluminum, which, in the depicted configuration, may provide support for over 200 pounds, while being half the weight of steel. Although the table surface 714 is shown as being flat, it may also have one or more grooves (e.g., stamped, bent, or attached) laterally along the surface to provide additional rigidity to the surface 714.

In some implementations, the support brackets 708, table surface 714, or reinforcing structures 716 (e.g., side walls) may include contours or cutouts to accommodate vehicle components. For instance, the table member 704 may have a cutout or other recess 722 for accommodating a gate or other component of the vehicle 104. Similarly, the support bracket 708, side wall 724a (e.g., relative to 724b), and drawer slide 726a may be shorter or mounted differently to accommodate the cutout 722/vehicle component. For instance, a first drawer slide 726a on a left side of the sliding table 704 may be mounted rearward/offset from the second drawer slide 726b on the right side of the sliding table 704 to allow the table 704 to slide evenly while also not interacting with the gate.

As illustrated in the figures, a reinforcing structure 716 may include one or more bends, bars, or other structures for providing additional rigidity and/or attachment points to the table member 704. For instance, the reinforcing structures 716 may be walls (e.g., bent from the top surface) along each of the sides of the table surface 714. The walls may prevent items from sliding off the table surface 714 when the vehicle 104 or table 704 are moving. In some instances, as illustrated, one or more walls may include perforations or other attachment points via which items may be secured to the sliding table 704.

In some implementations, the side walls 726a and 726b of the sliding table 704 may be tall enough to allow the side walls 724 to couple with the support brackets 708. For instance, the side walls may be coupled with the support brackets using drawer slides or other coupling, sliding mechanisms. Although two drawer slides 726 are shown mounted vertically to the side walls 724 in the figures, it should be noted that 1, 2, 3, or more drawer slides may be used and they may be mounted vertically to the wall sides 724 or horizontally to the bottom of the table surface 714, although this may provide less support to the sliding table 704, depending on the configuration of the drawer slides 726.

As illustrated in FIGS. 7B-7D, the sliding table system 702 may include or couple with a shelf 706. Depending on the implementation, the shelf 706 may couple with one or more of the support bracket(s) 708, the drawer slide(s) 726, the enclosure system (e.g., 102, 202, or 302), the vehicle 104, and/or the side wall(s) 724. For example, when the shelf 706 couples with the support bracket(s) 708, the shelf 706 may be stationary, so that it does not slide with the table member 704, but rather maintains a secure storage surface in the vehicle 104 even when the table member 704 slides out. When the shelf 706 couples with the drawer slide(s) 726 and/or side walls 724, the shelf 706 may slide with the table member 704.

In some implementations, the shelf 706 may include one or more side walls 732 and/or other reinforcements, which may be attached to a shelf top and/or integrated as a single piece (e.g., of a bent plate or form molded member). A side wall 732 of the shelf 706 may provide a mounting point and/or rigidity to the shelf 706. For example, the side wall 732 may include one or more vertical rows of mounting points 734 that mount the side wall 732 with the bracket(s) 708. For instance, the mounting points 734 may allow the shelf 706 to be mounted to the system 702 at various heights.

In some implementations, the brackets 708 may be tall enough and include sufficient mounting points (e.g., bolt holes, nuts, latches, etc.) to couple with one or multiple shelves 706 and/or table members 704 on the brackets 708. For example, the multiple table members 704 and/or multiple shelves 706 may be stacked at varying heights and/or quantities. For instance, each of two or three shelves 706 may couple, via respective mounting points 732 on the shelves 706 coupling with corresponding mounting locations on the bracket(s) 708 (e.g., while the shelf walls 732 are illustrated as being wider than the brackets 708, they may be narrower or angled to allow multiple to be attached).

FIG. 7D is a back perspective view of an example sliding table system 702. For instance, the back of the sliding table system 702 may face inward toward a vehicle 104.

In some implementations, a front and/or back wall of the sliding table 704 may be shorter than the side walls 724, for example, to provide rigidity while also allowing items to be lifted or placed over the front/back wall. For instance, a height of the front or back wall may correspond to a height of a floor of the vehicle, top of a folded seat back, a shelf 706 edge, or other structure to allow longer items to be placed across the front or back wall.

FIG. 7E illustrates an example support bracket 708, which may couple a table member 704 and/or shelf 706 to a vehicle 104. For instance, the support bracket 708 may adapt points at which objects may be mounted to the vehicle 104 to mounting points of the table member 704 and/or shelf 706.

The support brackets 708 of the sliding table system 702 may be attached to a vehicle's floor or walls, to the enclosure system 102, 202, or 302, or to other brackets. For instance, the support brackets 708 may have a shape, size, arrangement of bolt holes, or other configurations that match a one or more vehicle mounting points on a floor of the vehicle 104. For example, the mounting support brackets 708 may attach to D rings, tie down points, or factory bolts in the floor of the vehicle. The support brackets (e.g., bolt holes thereof) may have various configurations to allow the support brackets to be mounted to various vehicle types and configurations, for example, with different or offset mounting points.

In some implementations, long bolts, washers, or rubber grommets may also be attached to the support brackets 708 to improve, strengthen, or quiet the coupling with the vehicle 104. For example, where bolt holes are recessed in a floor of the vehicle 104, rubber grommets may be used to prevent bolts from shifting, thereby providing better lateral support to the bolts when passing through the recessed area and/or holes.

In some implementations, one or more of the drawer slides 726 may have a locking mechanism 736 to prevent the sliding table 704 from moving inward or outward from the vehicle 104 when the vehicle 104 is on a slope or accelerating/decelerating. Although the locking mechanism 736 is illustrated as being integrated with the drawer slide 726, it should be noted that the table member 704 may be locked directly to a mounting bracket 708, for example, using a pin or lock passing through a wall 724 (e.g., a side, back, or front wall) of the table member 704 and a support bracket 708 or otherwise locking the components together.

FIG. 7F illustrates an example sliding table system 702 coupled with an example vehicle 104. The sliding table system 702 may be placed in a cargo area of a vehicle 104, such as a sport utility vehicle, van, or pickup truck, for example, it is shown installed in a trunk area of a Jeep Wrangler® in FIG. 7F. It should be noted that while a shelf 706 is not illustrated in FIG. 7F, it may also be included and/or attached with the sliding table system 702. FIG. 7F also illustrates an example enclosure system 102, 202, or 302 mounted to the vehicle 104.

As described below, the sliding table system 702 may be mounted to a floor 746 of the vehicle 104, wall of the vehicle 748, or to an enclosure system (e.g., a top/lid, side walls, back wall, etc.), examples of which are described above. A table surface 714 of the sliding table 704 may slide outward from the storage area of a vehicle 104 to allow items on the table surface 714 to be more easily accessed and/or items under the sliding table 704 to be accessed. For instance, when the table surface 714 is extended/slid outward, a storage area under a trunk of the vehicle 104 (e.g., for a spare tire, tool kit, or storage) may be accessed.

The sliding table system 702 may be sized to fit a width of a vehicle storage area or an opening thereof, so that it may be secured to factory vehicle mounting points or an enclosure system. Similarly, this configuration may allow storage under the table to be opened/accessed. Although, the sliding table 704 is illustrated as filling substantially the entire width of the storage area of the vehicle 104, it should be noted that other sizes or shapes are possible and contemplated herein.

In some implementations, as illustrated in FIG. 7F, the sliding table may be mounted close to the floor of the vehicle to allow taller items, such as refrigerators, etc., to be placed thereon while still providing clearance from other structures, such as an enclosure system (e.g., 102, 202, or 302), trunk lid, etc. Additionally, the sliding table 704 may be placed, so that a floor or lid of under-floor storage may be removed or replaced with the sliding table system 702 in place, for example, to allow easier access to the under-floor storage when the sliding table member 704 is extended out from the vehicle 104.

It should be noted that although certain configurations and features are described in reference to the sliding table system 702, other implementations are possible and contemplated herein. For instance, the table member 704 may have various shapes, may be coupled with the brackets 708 using various mechanisms, or other configurations are possible.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. An enclosure system for vehicles comprising:
a body including one or more mounting points for mounting the body in a passenger compartment of a vehicle and adapted to fit under a bench seat in the vehicle, the body including a front wall, a rear wall, a first side wall, and a second side wall, the front wall being located toward a front end of the vehicle when the enclosure system is mounted in the vehicle, the rear wall being located toward a rear end of the vehicle when the enclosure system is mounted in the vehicle, the first side wall and the second side wall coupling the front wall and the rear wall together;
a first door coupled with the body using a first hinge, the first hinge coupling a first edge of the first door with a top edge of the front wall of the body, the first door closing over a top of the body when in a closed position and pivoting toward the front end of the vehicle when in an open position, the first door and the body forming a first cavity when the first door is in a closed position; and
a first locking mechanism locking the first door with the body.

2. The enclosure system for vehicles of claim 1, further comprising:
a second door coupled with the body using a second hinge, the second hinge coupling a second edge of the second door with the top edge of the front wall of the body, the second door closing over the top of the body when in a closed position and pivoting toward the front end of the vehicle when in an open position, the first door and second door covering the first cavity when the first door and the second door are in a closed position; and
a third door coupled with the body using a third hinge, the third hinge coupling a third edge of the third door with the rear wall of the body, the third door closing over the top of the body when in a closed position and pivoting toward the rear end of the vehicle when in an open position, the third door and the body enclosing a second cavity in the enclosure system.

3. The enclosure system for vehicles of claim 2, wherein:
the front wall is vertical; and
the first door forms an acute angle with the front wall when the first door is in a closed position.

4. The enclosure system for vehicles of claim 2, wherein:
the body includes a floor panel coupled with the rear wall, the floor panel enclosing the first cavity and including the one or more mounting points for mounting the body to the vehicle; and
the second cavity includes an opening exposing a floor of the vehicle in the second cavity.

5. An enclosure system for vehicles comprising:
a body including one or more walls, the body including one or more mounting points that mount the body to a vehicle under a seat of the vehicle, a front side of the body facing a front end of the vehicle when the enclosure system is mounted to the vehicle, a rear side of the body facing a rear end of the vehicle when the enclosure system is mounted to the vehicle, a left side and a right side connecting the rear side with the front side, the left side facing a left side of the vehicle, the right side facing a right side of the vehicle; and
one or more doors coupled with the body using one or more mounting mechanisms, the one or more doors and the body forming a first cavity when the one or more doors are in a closed position.

6. The enclosure system for vehicles of claim 5, wherein:
the one or more mounting mechanisms include one or more hinges located on the front side of the body, the one or more hinges allowing the one or more doors to pivot towards the front end of the vehicle.

7. The enclosure system for vehicles of claim 5, wherein:
the one or more walls include a front wall at the front side of the body that is vertical and extends between a floor of the vehicle and the one or more doors; and
the one or more doors form an acute angle with the front wall when the one or more doors are in a closed position.

8. The enclosure system for vehicles of claim 5, wherein:
the one or more doors include a first door and a second door;
the first door and the second door are located on a top of the enclosure system when the enclosure system is mounted to the vehicle and the first door and the second door are in a closed position; and
the first door, the second door, and the body form a first cavity.

9. The enclosure system for vehicles of claim 8, wherein:
the one or more doors include third door located on the top of the enclosure system.

10. The enclosure system for vehicles of claim 9, wherein:
the first door and the second door pivot in a first direction when opening; and
the third door pivots in a second direction when opening, the first direction being different from the second direction.

11. The enclosure system for vehicles of claim 5, wherein:
the one or more doors include a first door, a second door, and a third door;
the first door and the second door provide access to the first cavity in the enclosure system;
the third door provides access to a second cavity in the enclosure system; and
the one or more walls separate the first cavity from the second cavity.

12. The enclosure system for vehicles of claim 11, wherein:
the body includes a floor panel coupled with the one or more walls, the floor panel enclosing the first cavity and including the one or more mounting points for mounting the body to the vehicle; and
the second cavity includes an opening exposing a floor of the vehicle in the second cavity.

13. The enclosure system for vehicles of claim 12, wherein:
the one or more walls include a passage in between the first cavity and the second cavity.

14. The enclosure system for vehicles of claim 12, wherein:
the opening exposing the floor of the vehicle in the second cavity provides access to a tire jack located inside the second cavity when the enclosure system is mounted to the vehicle.

15. The enclosure system for vehicles of claim 5, further comprising:
a locking mechanism that lockably couples the one or more doors to the body to secure the first cavity of the enclosure system.

16. The enclosure system for vehicles of claim 15, wherein:
the one or more doors include a first door and a second door; and
the locking mechanism includes two locks on the first door that lockably couple the first door to the body to secure the first cavity of the enclosure system.

17. The enclosure system for vehicles of claim 15, wherein:
the one or more mounting mechanisms of the one or more doors are coupled with each of the one or more doors and the body using fasteners that are not accessible from outside of the first cavity of the enclosure system.

18. The enclosure system for vehicles of claim 5, wherein:
the one or more walls are constructed from a metal plate with one or more bends at one or more corners of the body, the one or more bends of the metal plate providing rigidity to the body.

19. The enclosure system for vehicles of claim 18, wherein:
a top edge of the one or more walls includes a bend in the metal plate that provides a latch point for a locking mechanism that locks the one or more doors to the body in a closed position.

20. A system comprising:
- a body including a front wall of the body facing a front end of a vehicle when the body is mounted to the vehicle, a rear wall of the body facing a rear end of the vehicle when the system is mounted to the vehicle, a right wall of the body facing a right side of the vehicle and coupling the front wall to the rear wall, and a left wall facing a left side of the vehicle;
- means for mounting the body under a seat of the vehicle;
- one or more doors couplable with the body, the one or more doors and the body forming an enclosed cavity when the one or more doors are in a closed position;
- means for coupling the one or more doors with the body;
- means for locking the one or more doors; and
- means for preventing the one or more doors from being decoupled from the body when the one or more doors are in a closed position.

* * * * *